US009506190B2

(12) United States Patent
Kemp et al.

(10) Patent No.: US 9,506,190 B2
(45) Date of Patent: *Nov. 29, 2016

(54) WHITEWATER RECOVERY PROCESS

(71) Applicant: Kadant Inc., Westford, MA (US)

(72) Inventors: Philip Mason Kemp, Pomfret Center, CT (US); Chris Spence, Knoxville, TN (US)

(73) Assignee: Kadant Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,755

(22) Filed: Feb. 17, 2015

(65) Prior Publication Data

US 2015/0259854 A1 Sep. 17, 2015

Related U.S. Application Data

(63) Continuation of application No. 13/801,306, filed on Mar. 13, 2013, now Pat. No. 8,986,503.

(51) Int. Cl.
| D21F 1/66 | (2006.01) |
| C02F 1/24 | (2006.01) |
| C02F 1/32 | (2006.01) |
| C02F 1/48 | (2006.01) |
| C02F 1/52 | (2006.01) |
| C02F 1/66 | (2006.01) |
| D21C 11/00 | (2006.01) |
| C02F 1/42 | (2006.01) |
| C02F 103/28 | (2006.01) |

(52) U.S. Cl.
CPC . *D21F 1/66* (2013.01); *C02F 1/24* (2013.01); *C02F 1/32* (2013.01); *C02F 1/488* (2013.01); *C02F 1/52* (2013.01); *C02F 1/66* (2013.01); *D21C 11/0021* (2013.01); *C02F 2001/425* (2013.01); *C02F 2103/28* (2013.01)

(58) Field of Classification Search
CPC .............. D21F 1/66; C02F 1/24; C02F 1/32; C02F 1/48
USPC ......................................................... 162/190
See application file for complete search history.

(56) References Cited

U.S. PATENT DOCUMENTS

| 3,980,562 | A | 9/1976 | Nilsson |
| 4,039,447 | A | 8/1977 | Miura et al. |
| 4,246,355 | A | 1/1981 | Bolto et al. |
| 4,427,550 | A | 1/1984 | Priestley |
| 4,981,593 | A | 1/1991 | Priestley et al. |
| 5,137,639 | A | 8/1992 | Guzik et al. |
| 5,308,499 | A | 5/1994 | Dixon et al. |
| 5,792,361 | A | 8/1998 | Wang et al. |
| 5,907,037 | A | 5/1999 | Gujral et al. |
| 6,099,738 | A | 8/2000 | Wechsler et al. |
| 6,315,906 | B1 | 11/2001 | Sassaman, Jr. et al. |
| 6,346,195 | B1 | 2/2002 | Filson et al. |
| 6,461,514 | B1 | 10/2002 | Al-Samadi |
| 6,589,427 | B2 | 7/2003 | Moghe et al. |
| 6,818,129 | B2 | 11/2004 | Kemp et al. |
| 6,896,815 | B2 | 5/2005 | Cort |
| 7,255,793 | B2 | 8/2007 | Cort |
| 7,270,796 | B2 | 9/2007 | Kemp et al. |
| 7,625,490 | B2 | 12/2009 | Cort |
| 7,686,960 | B2 | 3/2010 | Cort |
| 7,691,269 | B2 | 4/2010 | Cort |
| 7,820,053 | B2 | 10/2010 | Cort |
| 2002/0117455 | A1 | 8/2002 | Moghe et al. |
| 2008/0073279 | A1 | 3/2008 | Cort |
| 2010/0059448 | A1 | 3/2010 | Fujieda et al. |

FOREIGN PATENT DOCUMENTS

| AU | 512553 | 10/1980 |
| AU | 518159 | 9/1981 |
| AU | 550702 | 4/1986 |
| CN | 1597543 A | 3/2005 |
| CN | 101613159 A | 12/2009 |
| CN | 101781031 A | 7/2010 |
| EP | 0 515 686 A1 | 12/1992 |
| EP | 0 486 574 B1 | 2/1994 |
| GB | 1482002 | 8/1977 |
| GB | 2 004 535 A | 4/1979 |
| WO | WO 91/02698 A1 | 3/1991 |

OTHER PUBLICATIONS

Invitation to Pay Additional Fees from PCT/US2014/023202, mailed Jul. 21, 2014.
International Search Report and Written Opinion for PCT/US2014/023202 mailed Oct. 31, 2014.
Bolto et al., Water purification with magnetic particles, Environmental Monitoring and Assessment. 1991;19:139-143.
Bursill, Drinking water treatment—understanding the processes and meeting the challenges. Water Science and Technology: Water Supply. 2001;1(1):1-7.
Carson, Metals, muck, and magnets. Ecos. 1991;67:24-26.
Daneault et al., Calcium ion removal by a synthetic zeolite in the manufacture of mechanical grade papers. Pulp and Paper Canada. Mar. 2005:42-45.
Howell et al., Littlehempston WTW, Devon £6.4m upgrade for waterworks serving 200,000 population. Water Treatment and Supply. 2007:179-181.
Lehane, A tidier way to clean up water. Ecos. 1982;31:24-27.
Loranger et al., The effect of zeolite on value-added paper manufacturing. Pulp & Paper Canada 2004;105(3):T53-T56.

(Continued)

*Primary Examiner* — Mark Halpern
(74) *Attorney, Agent, or Firm* — Wolf, Greenfield & Sacks, P.C.

(57) ABSTRACT

Whitewater recovery processes, and associated systems and components, are generally described. Certain embodiments relate to whitewater recovery processes in which ion exchange is used to remove dissolved ions from the whitewater, which can reduce the degree to which chemical additives are used in the process. In certain embodiments, flocculation and/or filter components can be employed to aid in the removal of suspended solids from the whitewater.

20 Claims, 11 Drawing Sheets

(56) References Cited

OTHER PUBLICATIONS

Mittal et al., Buildup of Dissolved Solids in a Paperboard Mill with Water Closure. Progress in Paper Recycling. May 2006;15(3):19-32.

No Author Listed, Ammonia removal from SiroflocOSTP treated Sewageusing Australian Natural Zeolite Report No. WSAA 113, Sep. 1996.

No Author Listed, Facilities plan: wet water treatment facilities, Technical Memorandum No. TM-CSO-10, Black & Veatch Corporation, Nov. 17, 1999:64-73.

No Author Listed, Maximize capacity, solids removal performance and plant stability with minimum footprint and installation costs. Water Technologies Corporate Information. Siemens AG. 2011. http://www.water.siemens.com/en/products/separation_clarification/Pages/biomag-comag . . . .

No Author Listed, Sedimentation processes. IWA Water Wiki, Sep. 1, 2009. Accessed online Sep. 20, 2011, http://www.iwawaterwiki.org/xwiki/bin/view/Articles/SedimentationProcesses.

No Author Listed, Sirofloc cleans up sewage in record time. Media Release 93-49. SIRO. May 17, 1993.

No Author Listed, Trafalgar to buy John Brown. Reuters. Retrieved Mar. 20, 2012, from The New York Times: http://www.nytimes.com/1986/05/08/business/trafalgar-to-buy-john-brown.html?partner=rssnyt&emc=rss, May 8, 1986.

Pavlova et al., Modified Sirofloc process for natural water treatment. Desalination. 2005;173:55-59.

Priestley, Sirofloc—unique method of water treatment. Web log post, Sanitary Engineer, May 11, 2011, http://sanitaryengineer01.blogspot.com/2011/05/sirofloc-unique-method-of-water.html.

Sain et al., Novel zeolite fillers for fresh water reduction in papermaking: effect on graded paper properties. TAPPI, 2001 Papermakers Conference, Ohio, Mar. 11-14, 2001:1-9.

Smook, Handbook for Pulp and Paper Technologies. 1997:chapter 16.

Stetter, Paper and Board, 5. Water Circuits Ullmann's Encyclopedia of Industrial Chemistry, Jan. 15, 2012, pp. 1-8.

Thibodeau et al., Calcium ion removal by a synthetic zeolite in the manufacture of mechanical grade papers. Pulp & Paper Canada 2005;106(3):T71-T74.

Yuenng et al., The buildup of dissolved solids in closed white water systems. TAPI Journal. Aug. 1, 2004;3(8):17-21.

[No Author Listed] Ultrafiltration OptiCycle W at UPM-Kymmene Tervasaari PM 8: Aid to Reduce Fresh Water Consumption. Fiber & Paper Express. Mar. 2006. < http://www.valmet.com/valmet/products/Vault2MP.nsf/BYWID2/WID-060927-2256E-F1A52/$File/Page3from306_express_EU%20ebook.pdf?openElement> Accessed on Mar. 23, 2017.

[No Author Listed] Water Management Systems Reference List—Membrane Filtration in Pulp & Paper Industry—OptiFilter CR. Dec. 2006. 5 pages.

Huhtamaki, Profitable Water Management Solutions to Meet Tightening Water Requirements. Fiber & Paper. 2002;4(4):10-13.

Kuula et al., Ultrafiltration membrane technology—more efficiency through water and coating color recycling. Metso Technology Review. Sep. 2007.

Teppler et al., PM white water treatment at Metsa-Serla Kirkniemi Mill in Finland. TAPPI International Environmental Conference Proceedings. Nashville, TN. 1999. 12 pages.

Office Communication for CN Application No. 201480022023.0 mailed Jul. 21, 2016.

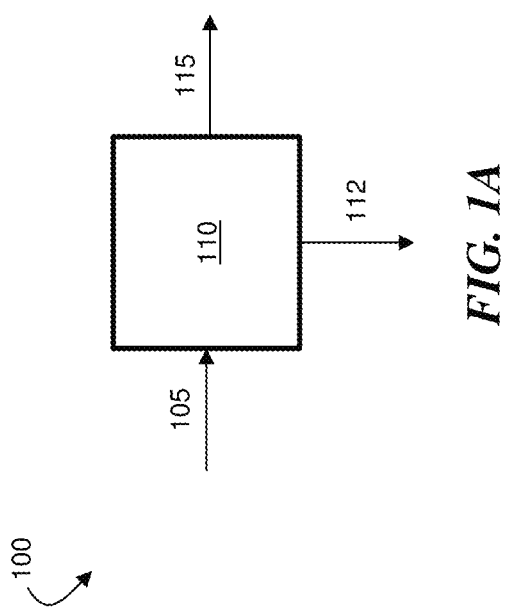

WHITEWATER RECOVERY PROCESS

RELATED APPLICATIONS

This application is a continuation of U.S. patent application Ser. No. 13/801,306, filed Mar. 13, 2013, and entitled "Whitewater Recovery Process," which is incorporated herein by reference in its entirety for all purposes.

FIELD OF INVENTION

Whitewater recovery processes, and associated systems and components, are generally described.

BACKGROUND

In traditional papermaking processes, water is introduced to the paper making system as a carrier fluid. The carrier fluid is used to suspend wood fibers, suspension aids, filler materials, and the like as a slurry, which is spread evenly over a wire web. The carrier fluid is drained, squeezed (e.g., using nips), and vacuumed away from the web, while most of the fillers, fibers, and retention aids remain on the web and eventually form the paper sheet. The water that is drained away from the paper sheet is called whitewater, due to the high residual fiber, filler, and brightener content, which imparts a white color to the water in some cases.

Papermaking processes generally utilize large amounts of water, with typical usages ranging from 200 gallons per ton of paper for highly recycled paper board to 30,000 gallons per ton of paper for specialty fine paper. In the early days of paper making, fresh water was routinely consumed from rivers and lakes to produce the paper. However, such large amounts of fresh water consumption were harmful to the environment. To limit environmental damage, there has been a movement to reduce fresh water use and reduce wastewater discharges from pulp and paper manufacturing facilities.

Current pulp and paper mills implement numerous whitewater reuse strategies. Most of these strategies clean the recycled wastewater using simple suspended solids clarification, filtration, and screening techniques. The reduction in fresh water make-up to the paper machine has resulted in a substantial increase in concentration of the contaminants in the whitewater system. The recovered water is generally used many times before it is finally discharged. Simple suspended solids clarification, filtration, and screening techniques do not address the increase in dissolved and colloidal solids in the whitewater loops. In many current systems, chemical additives are fed to the whitewater stream in an attempt to control organic material, colloidal solid, and dissolved ion accumulation. However, many typical reuse strategies are unable to effectively remove fine colloidal substances, total dissolved solids (including scale causing ions), and foulants such as iron aluminum and bacteria. As a result, a significant amount of dissolved and colloidal substances introduced by the paper process are allowed to cycle up in concentration as the whitewater is continuously reused and as fresh water make-up is reduced. This can cause numerous problems in the paper machine, paper product, and in other areas of the mill. For example, as sparingly soluble salts cycle up in concentration, they may eventually precipitate and scale. As colloidal anionic particles (commonly referred to as anionic trash) cycle up in concentration, they may inhibit the flocculation and removal of suspended solids, leading to the fabrication of an inferior paper product. In addition, the buildup of total dissolved solids (TDS) and especially anionic colloidal trash adversely affects the performance of retention aids, which are chemical additives that promote the retention of fibers on the paper web and dewatering of the paper product when the wet slurry is undergoing the dewatering process. If the fibers on the web do not dewater properly, drainage aids are sometimes applied. The increased contaminant load in the whitewater reduces the effectiveness of the drainage aids. As a result, the paper sheet in production has a higher moisture content, which can increase the amount of heat energy that is required to be used to dry the paper in the dryer section of the paper machine. The energy increase can be substantial and costly.

Two basic techniques are primarily utilized to control the buildup of sparingly soluble salts and anionic colloidal substances. One such technique involves chemical addition. For example, sequestration chemicals can be added to complex or chelate multivalent cations so they can no longer easily bind with counter ions such as sulfate and carbonate to form scale. Another technique involves chemical softening. This technique is based on the principal that raising the pH of a solution in the presence of alkaline ions brings the sparingly soluble salts to their saturation point. This causes the salts that are present to precipitate as a solid for subsequent removal by sludge dewatering systems.

The addition of chemical additives to process whitewater can cause several problems. For example, continuous addition of chemical additives is necessary to control scaling and fouling. Continual addition of chemical additives is also needed to compensate for increasing concentrations of contaminants in the whitewater loops. The chemicals are in part charge neutralized by the increased contaminant load in the whitewater. The excess chemical consumption is costly to the mill and causes a buildup of total dissolved solids (TDS), which make the whitewater difficult to treat when it is finally discharged. The buildup of chemical additives and background salts has a significant negative effect on mill production, sheet quality, and consumption of heat energy, as described above. Chemical additives that are used in traditional whitewater recycling processes are also consumed in part by the anionic trash within the whitewater, as the anionically charged colloids attach to the cationic chemical additives. Because the anionic trash consumes the chemical additives, the chemical additives must be added in excess, which can increase the degree to which additives accumulate in the process. Systems and methods for whitewater clarification that do not involve the addition of large amounts of chemical additives would be desirable.

SUMMARY OF THE INVENTION

Whitewater recovery processes and associated systems and components are generally described. Certain embodiments relate to whitewater recovery processes in which selective ion exchange is used to remove dissolved ions from the whitewater, which can reduce the degree to which chemical additives are used in the process. In certain embodiments, flocculation and/or filter components can be employed to aid in the removal of suspended solids from the whitewater. Certain of the inventive systems and methods described herein achieve a balance between contaminant removal techniques and reduced addition of chemical additives, which ultimately enhances the profitability and effectiveness of the paper production process. The subject matter of the present invention involves, in some cases, interrelated products, alternative solutions to a particular problem, and/or a plurality of different uses of one or more systems and/or articles.

In one aspect, a system for the recovery of whitewater containing cations and suspended solids is provided. The system comprises, in some embodiments, a flocculation vessel containing a flocculent able to agglomerate the suspended solids to form agglomerations of the flocculent and the suspended solids upon exposure of the flocculent to a liquid input stream comprising whitewater or derived from whitewater, the flocculation vessel configured to produce a supernatant stream containing a lower quantity of suspended solids than the liquid input stream; a filter configured to receive at least a portion of the supernatant stream, the filter configured to produce a retentate stream and a filtrate stream, the filtrate stream containing a lower quantity of suspended solids than the retentate stream; and an ion exchange vessel configured to receive at least a portion of the filtrate stream, the ion exchange vessel containing an ion exchange medium configured to remove at least a portion of the cations from the filtrate stream. In certain embodiments, a method of treating whitewater is provided. The method comprises, in certain embodiments, exposing a liquid input stream comprising whitewater or derived from whitewater and containing cations and suspended solids to a flocculent such that agglomerations of flocculent and suspended solids are formed; removing at least a portion of the agglomerations from the liquid input stream to produce a supernatant stream containing a lower quantity of suspended solids than the liquid input stream; filtering the supernatant stream to produce a retentate stream and a filtrate stream containing a lower quantity of suspended solids than the retentate stream; and removing at least a portion of the cations from the filtrate stream using an ion exchange medium.

In some embodiments, the method comprises flowing a liquid input stream comprising whitewater or derived from whitewater and containing cations through an ion exchange vessel containing an ion exchange medium; and removing at least a portion of the cations from the liquid input stream using the ion exchange medium to produce an ion exchanged effluent stream.

The method comprises, in certain embodiments, contacting a liquid stream comprising whitewater or derived from whitewater and containing calcium carbonate with an ion exchange medium; and adjusting or maintaining a pH of the liquid input stream at or below about 7.5 such that at least a portion of the calcium carbonate is dissolved within the liquid input stream prior to or while being contacted with the ion exchange medium.

In certain embodiments, the method comprises exposing a liquid input stream comprising whitewater or derived from whitewater and containing cations and suspended solids to a flocculent and a magnetically responsive material such that agglomerations of flocculent, magnetically responsive material, and suspended solids are formed; removing at least a portion of the agglomerations from the liquid input stream using a magnet to produce a supernatant stream containing less suspended solids than the liquid input stream; and removing at least a portion of the cations from the supernatant stream using an ion exchange medium.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A is an exemplary schematic illustration of an ion exchange process step of a whitewater recovery system, according to certain embodiments;

DETAILED DESCRIPTION

Figure 1B:
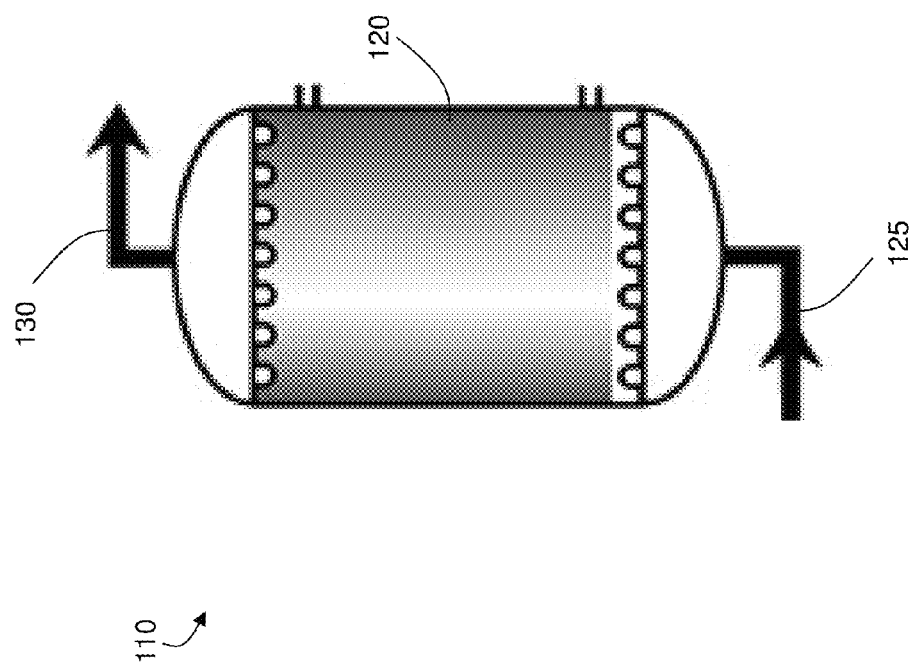
FIG. 1B is, according to certain embodiments, a schematic illustration of an ion exchange vessel.

Whitewater recovery processes and associated systems and components are generally described. Certain embodiments relate to whitewater recovery processes in which dissolved ions are removed from the whitewater via ion exchange, the use of which can reduce the degree to which chemical additives are used in the process. In certain embodiments, flocculation and/or filter components can be employed to aid in the removal of suspended solids from the whitewater. The flocculation and/or filter components may also be operated, in certain embodiments, with little or no net addition of chemical reagents. The ability to remove suspended solids and dissolved ions from whitewater with limited or no net addition of chemical reagents can provide a variety of advantages, including reducing precipitation and scaling in the paper-making system, enhancing the degree to which dewatering is achieved prior to heat drying the paper product, and enhancing the quality of the paper that is produced, among other benefits.

In certain embodiments, ion exchange is used to remove at least a portion of the cations within the recovered whitewater. Certain embodiments are directed to the inventive recognition that many solids (including precipitates such as calcium carbonate and other sparingly soluble salts) can be removed by dissolving such solids within the whitewater (for example, by adjusting the pH or other conditions within the whitewater) and subsequently removing the dissolved ions from the whitewater. This is in contrast to many prior art methods, in which such solid material is removed using traditional solids removal methods, such as filters and the like.

In particular, the whitewater recovery systems described herein can be used to remove cations of sparingly soluble salts (including multivalent cations ions such as $Mg^{2+}$, $Ca^{2+}$, $Sr^{2+}$, $Ba^{2+}$, $Fe^{2+}$, $Mn^{2+}$ and $Al^{3+}$). The cations of sparingly soluble salts can precipitate out within the papermaking process and cause scaling when they are combined with counter anions (e.g., carbonate, sulfate, hydroxide, and the like). In addition, the presence of multivalent ions (and especially $Ca^{2+}$) can lower the solubility of pitch originating from the wood pulp and fibers, which can precipitate out of solution. The precipitated pitch is sticky, and can cause fouling problems within paper machines and/or on paper products. Removal of multivalent cations can reduce the degree to which precipitation and scaling occur in the papermaking process, which can reduce the frequency with which the papermaking machines must be cleaned and improve the quality of the paper. In some embodiments, the pH of the water that is being processed is adjusted to increase the solubility of sparingly soluble salts (such as multivalent cations), after which adjustment, the ion exchange medium can be employed to remove the dissolved ions.

The ion exchange methods described herein can, in certain embodiments, remove cations of sparingly soluble salts without the addition of chemical sequestration agents or with use of reduced quantities of such materials compared with typical conventional whitewater recovery approaches. In many prior systems, ionic charge from background salts creates a buffering effect in the whitewater that overwhelms wet strength agents, starch modifiers, sizing chemistries, and numerous other chemical additives typically employed in the papermaking process. This makes it necessary to add these additives in excess in order to overcome the charge neutralization/buffering effect. Moreover, additional new and specialty chemicals may be required to address the buffering effect, often at a cost premium. The continual addition of excess chemicals and additional specialized chemistry creates a compounding effect and results in a buildup of chemicals in the whitewater. This makes the final effluent more difficult to treat and ultimately increases contaminant loads to and salinity in the environment, the papermaking machine, and the paper product made by the papermaking machine. The present ion exchange process involves a much different approach. Rather than sequestering contaminants via the addition of chemical reagents, the ion exchange process effectively removes the contaminants from the whitewater. The use of ion exchange can thus prevent the cycling up of the concentration of the contaminants in the whitewater as fresh water makeup flow rates are reduced.

In certain embodiments of the inventive ion exchange processes, an ion exchange medium (e.g., an ion exchange resin such as a cationic ion exchange resin) is used to remove dissolved cations of one type from the whitewater, replacing them with cations of another type. For example, particular embodiments of the inventive ion exchange processes described herein can be used to remove multivalent cations (e.g., $Me^{2+}$, $Ca^{2+}$, $Sr^{2+}$, $Ba^{2+}$, $Fe^{2+}$, $Mn^{2+}$ and/or $Al^{3+}$) and substitute them with monovalent cations (e.g., $Na^+$, $K^+$, $NH_4^+$), which are generally much more soluble than multivalent cations in many environments (e.g., in environments with high concentrations of carbonate and sulfate). Because the monovalent ions are much more soluble, they do not tend to precipitate or scale under typical conditions in which the whitewater is used in the papermaking process. As one particular example, at approximately 32° C., sodium sulfate has a solubility that is over 700 times greater than that of calcium sulfate.

FIG. 1A is a schematic diagram illustrating whitewater recovery system 100, which can be used to recover a liquid input stream 105 comprising whitewater or derived from whitewater. The whitewater within liquid input stream 105 can comprise water originating from any source within a paper making process. The liquid within stream 105 can be whitewater directly from a whitewater source, or whitewater that has been pre-processed or otherwise modified. Liquid input stream 105 can contain anions and/or cations, in certain embodiments. For example, liquid input stream 105 can contain multivalent cations, such as $Mg^{2+}$, $Ca^{2+}$, $Sr^{2+}$, $Ba^{2+}$, $Fe^{2+}$, $Mn^{2+}$, and/or $Al^{3+}$. Liquid input stream 105 might also contain suspended solids such as paper fragments (e.g., wood fiber, pulp, etc.), colloidal material (such as anionic colloidal trash), or other solid components, although in other embodiments, such contaminants might not be present (e.g., they may be pre-removed using, for example, flocculation and/or filtration processes, including those described elsewhere herein). In certain embodiments, liquid input stream 105 originates from an upstream process within a whitewater recovery process, such as a flocculation or filtration process, as described in more detail below. In other embodiments, liquid input stream 105 originates directly from a whitewater effluent stream of a papermaking process.

In FIG. 1A, liquid input stream 105 is flowed through an ion exchange vessel 110 containing ion exchange medium. When liquid input stream 105 is contacted with the ion exchange medium, at least a portion of the cations within liquid input stream 105 can be removed (and cations within the ion exchange medium can be released) to produce an ion exchanged effluent stream 115. In certain embodiments, the amount of multivalent cations within ion exchanged effluent stream 115 is lower than the amount of multivalent cations within liquid input stream 105. For example, in some embodiments, the amount of multivalent cations (e.g., any one or more of $Mg^{2+}$, $Ca^{2+}$, $Sr^{2+}$, $Ba^{2+}$, $Fe^{2+}$, $Mn^{2+}$, and/or $Al^{3+}$) within the ion exchanged effluent stream 115 is at least about 70% lower, at least about 80% lower, at least about 90% lower, at least about 95% lower, or at least about 99% lower than the amount of multivalent cations within liquid input stream 105.

A variety of types of ion exchange media can be used, and there are several factors that are typically considered when choosing an ion exchange medium. Generally, the ion exchange medium should be configured such that, upon exposure of the ion exchange medium to the whitewater, relatively undesirable ions (including certain multivalent ions) from the whitewater are selectively bound to the ion exchange medium. In some such cases, other ions within the ion exchange medium (e.g., sodium, potassium, and the like) are simultaneously released into the whitewater in exchange for the multivalent ionic species. In many embodiments, complete removal of all ions within the ion exchange step is not necessary or practical. For example, in many cases, the concentration of all ionized salts within the whitewater stream would easily overwhelm the ion exchange apparatus and require an excess of regeneration chemicals and regeneration water. The normal high salt content of the whitewater would quickly exhaust the ion exchange medium, and the volume of water needed to feed the regeneration reagent (required to regenerate the ion exchange medium) would approach or surpass the volume of initial whitewater that is being recovered, therefore making the process impractical.

Accordingly, in certain embodiments, the ion exchange resin is chosen that selectively removes target ions from the whitewater stream. For example, the ion exchange medium can be chosen such that it removes only components of sparingly soluble salts (such as multivalent ions like $Mg^{2+}$, $Ca^{2+}$, $Sr^{2+}$, $Ba^{2+}$, $Fe^{2+}$, $Mn^{2+}$, and/or $Al^{3+}$). In some such embodiments, the ion exchange medium replaces the removed ions with highly soluble ions such as $Na^+$, $K^+$, and $NH_4^+$.

Another factor that can be considered during the selection of the ion exchange medium is the flow rate of the whitewater recovery process. In certain embodiments, the whitewater recovery process is configured to process relatively high flow rates of whitewater (e.g., flow rates of at least 500 gallons per minute, up to 5,000 gallons per minute, or higher). Accordingly, in such embodiments, it can be important to select an ion exchange medium that is capable of allowing such flow rates to economically pass through the ion exchange resin while maintaining intimate contact between the resin and the whitewater. The whitewater recovery systems described herein are not required to treat an entire whitewater flow. For example, in some embodiments, the recovery whitewater system is configured such that it treats only an amount of flow that is sufficiently high to inhibit or prevent the accumulation of contaminants within the papermaking process. In certain embodiments, the whitewater recovery system is configured such that the contaminant removal rate equals or exceeds the contaminant introduction rate from the paper making process. Configuring the whitewater recovery process in this way can bring the contaminants in the whitewater loops to a point of equilibrium, thereby preventing the contaminates from cycling up in concentration and causing scaling and fouling. In addition, configuring the whitewater recovery process in this way can diminish the need for the addition of excess chemical additives. The ability of a particular ion exchange medium to maintain a high operating flow rate can depend on the geometry of the ion exchange medium itself and the quantity of the ion exchange sites in the resin. For example, if the ion exchange medium comprises beads or particles with relatively large pores (e.g., macroreticular resins), the water (and any unwanted contaminants, such as organic material) can more freely flow (e.g., diffuse) through the pores of the medium matrix. A high concentration of ion exchange sites per unit volume of ion exchange medium will also allow the medium to exhibit rapid kinetics and sustain effective contaminant removal at high operating flux. On the other hand, if the pores within the ion exchange medium are small (as might be the case with many conventional gel ion exchange resins), the resin can trap organic materials and make it difficult to remove the organics during normal regeneration of the ion exchange medium. Gross suspended solids contamination can cause water to flow around the medium (rather than through it), and limit the interaction between the ions within the whitewater and the active sites within the ion exchange medium. This principle also illustrates why it is important to establish proper pretreatment to protect the ion exchange column and the ion exchange medium from fouling, for example, using the methods described elsewhere herein.

It is important, in certain embodiments, to select an ion exchange medium that has a high operating capacity (i.e., they contain many active sites per unit volume). The use of an ion exchange medium with a high operating capacity can reduce the size of the ion exchange system, making it easier to integrate into a whitewater recovery process.

In some embodiments, the ion exchange medium comprises an ion exchange resin. Ion exchange resins are generally water insoluble matrix materials fabricated from organic polymers. Ion exchange resins can be provided in the form of gels, porous beads, or in any other suitable form that allows for the transport of water through the ion exchange resin.

In certain embodiments, the ion exchange medium comprises a weak acid cation resin (i.e., an ion exchange resin that is weakly acidic). In certain embodiments, the weak acid cation resin contains carboxylate functional groups. In some embodiments, the weak acid cation resin contains other weakly acidic functional groups, such as aminomthylphosphonic functional groups or iminodiacetic acid functional groups. Examples of suitable weak acid cation resins include, but are not limited to, Lewatit® TP 260, Lewatit® TP 207, and Lewatit® CNP80-WS from Lanxess (Leverkusen, Germany); IMAC® HP336 and Dowex™ MAC-3 from Rohm and Haas Company (Philadelphia, Pa.); and SST80DL from The Purolite® Company (Bala Cynwyd, Pa.).

The use of weak acid cation resins as the ion exchange medium can be particularly advantageous in certain embodiments. Generally, weak acid cation resins have relatively large operating capacities. In addition, weak acid cation resins are relatively easy to regenerate compared to many other ion exchange media. For example, unlike many conventional strong acid cation (SAC) resins (which are frequently used in conventional water softening), weak acid cation resins can be selected that are easily regenerated by adding mineral acid in an amount of between about 100% and 120% percent the stoichiometric equivalent. With many conventional SAC resins, regeneration is generally achieved by feeding NaCl (e.g., in a brine solution) at a level of between about 200% and about 300% of the stoichiometric equivalent. The use of such large amounts of NaCl can, in certain cases, result in high salt discharges to the environment. The brine cycle can also, in certain instances, create the potential for significant introduction of chloride in the softener effluent. This could cause considerable corrosion issues in the downstream components, especially those that make use of stainless steel piping and other components.

In some embodiments, the ion exchange medium comprises a strong acid cation resin (i.e., an ion exchange resin that is strongly acidic). In certain embodiments, the strong acid cation resin contains sulfonic acid functional groups. Examples of suitable strong acid cation resins include, but are not limited to, Lewatit® S 1667 and Lewatit® S 1668 from Lanxess; Amberlite™ FPC23 H, Dowex™ Monosphere C-350, Dowex™ G-26, Dowex™ Monosphere C-10, and Dowex™ Monosphere Marathon C from Rohm and Haas Company; and SST60H and SST80DL from The Purolite® Company.

In some embodiments, the ion exchange medium comprises a chelating resin. The chelating resin can comprise, for example, iminodiacetic acid. Suitable chelating resins include, but are not limited to, S930 from The Purolite® Company and TP207 from Lanxess.

While the use of resins as ion exchange media has been primarily described, it should be understood that the invention is not so limited, and in other embodiments, ion exchange media comprising a zeolite, a clay (e.g., montmorillonite clay), soil humus, or any other suitable ion exchange medium could be employed. In certain embodiments, however, the use of resins as the ion exchange medium is preferred. For example, in some instances, zeolites can be difficult to regenerate, can exhibit much higher contaminant leakage, can cause particle shedding/release, and can require frequent replacement.

Ion exchange vessel 110 can assume a variety of configurations. In certain embodiments, the ion exchange medium can be immobilized within ion exchange vessel 110 that comprises a packed column. FIG. 1B is a perspective view schematic illustration of an exemplary ion exchange vessel 110. In FIG. 1B, ion exchange medium is immobilized within vessel compartment 120. Ion exchange vessel further comprises an inlet 125 and an outlet 130. A liquid input stream comprising whitewater or derived from whitewater can be transported through ion exchange compartment 120 via inlet 125, and subsequently out of ion exchange compartment 120 via outlet 130. The ion exchange medium can be immobilized within the ion exchange compartment, for example, by placing meshes or other screens in or near inlet 125 and/or in or near outlet 130, such that the whitewater is transported through the ion exchange medium without entraining or otherwise transporting the ion exchange medium out of ion exchange vessel 110. Suitable columns include those designed and/or manufactured by Graver Water Systems, New Providence, N.J.; General Electric; Siemens Water Technologies (Broussard, La.); and Bayer AG (Via Lanxess). While a single ion exchange vessel is illustrated in FIG. 1B, the invention is not limited to the use of single ion exchange vessels, and in certain embodiments, a plurality of ion exchange vessels are employed.

By immobilizing the ion exchange medium within compartment 120, harmful ions can, in certain embodiments, be removed or partially removed from the whitewater stream without adding ion exchange medium or any other material to the whitewater stream, thereby producing an ion exchange stream that is generally free of added chemical components (aside from the exchanged ions originating from the ion exchange medium).

While systems in which the ion exchange medium is contained within an ion exchange vessel have been described, and while the use of vessels in which the ion exchange medium is contained can impart certain advantages, it should be understood that the invention is not so limited, and that in other embodiments, the ion exchange medium can be used to process the whitewater without being contained within a vessel. For example, the ion exchange medium can be added to the whitewater stream and subsequently filtered out of the whitewater stream without the ion exchange medium being confined to a particular vessel.

In certain embodiments, removing at least a portion of the cations from the whitewater stream using the ion exchange medium is performed at a pH of between about 5.5 and about 8.5 or between about 5.5 and about 7.5. Operating within such a pH range can allow one to use weak acid cation ion exchange media, which are stable in moderately acidic environments (and which provide several advantages including higher operating capacity, as discussed elsewhere herein). In addition, operating within this pH range increases the solubility of $Ca^{2+}$ and other sparingly soluble ions, relative to their solubilities at pHs outside this range.

After the whitewater has been transported through the ion exchange medium for a period of time, the ion exchange medium can be processed to remove the collected multivalent ions and regenerated such that the medium is again capable of exchanging monovalent ions for multivalent ions. For example, in certain embodiments, an acidic solution (e.g., a dilute acid solution such as 0.5-4% $H_2SO_4$ or 5-10% HCl) can be flowed through the ion exchange medium, which results in the multivalent ions being stripped from the ion exchange medium. This step can be used to concentrate the multivalent ions and other contaminants into a small, manageable liquid waste stream (e.g., stream 112 in FIG. 1A), which can, in certain embodiments, be neutralized and discharged to, for example, a central wastewater treatment plant. After removing the whitewater contaminants, the ion exchange medium can be regenerated, for example, using the process steps described above in certain embodiments in which weak acid cation- and strong acid cation-based ion exchange media are employed. The ability to establish ion exchange resin selectivity for the removal of contaminating species (such as multivalent ions), the ability to strip the contaminants from the ion exchange medium for subsequent disposal, and the ability to reuse the ion exchange medium represent several significant benefits of the inventive ion exchange systems described herein.

In certain embodiments, an alkaline solution can be used to neutralize the ion exchange medium to maintain a neutral or near-neutral pH within the ion exchange apparatus and/or within the processed whitewater flowing from the ion exchange medium. For example, in certain embodiments in which weak acid cation resins are employed, the resin is neutralized with caustic in order to maintain a near-neutral pH in the ion exchange effluent and to guard against downstream chloride release.

The degree to which the effluent and operating pH of the ion exchange apparatus is adjusted (e.g., using alkaline solution) during ion exchange medium regeneration is generally based on the needs of the particular papermaking system in which the whitewater recovery process is being used. For example, many paper mills introduce fillers to the pulp slurry. The fillers (such as precipitated calcium carbonate (PCC) and ground calcium carbonate (GCC), talc, clay, silica, and other fillers) are often added because they are less costly than wood fiber. PCC, GCC, and other fillers also increase the brightness of the paper sheet and are often used with fine white paper products like copy paper. A slight downward shift in the pH of the whitewater easily solubilizes a significant portion of the PCC and/or the GCC. In such cases, the $CO_3$ portion of the PCC and GCC dissolves and is converted to $CO_2$, which is subsequently released from the ion exchange column. As the pH of the solution drops from 8 to 7, the amount of dissolved calcium increases by approximately 2 orders of magnitude. The pH of the solution as it passes through the weak acid cation (WAC) resin can be reduced by the acidic environment of the weak acid cation resin. The greater the downward shift in pH, the greater the increase in dissolved calcium.

The dissolution of PCC and GCC can be especially important, for example, for fine white paper production and for the box industry. Once the PCC or GCC is introduced to the paper machine, it predominantly leaves the paper machine as product, and its task is complete. Residual PCC and GCC can, in certain instances, pass through the web of the paper production process and may be present in the whitewater. The whitewater is then often reused. When it is returned to the paper machine it can come in contact with size chemistry. A common size agent, alkyl succinic anhydride (ASA), forms a hydrolysis reaction product with multivalent cations, and with calcium in particular. Solubilization of calcium from PCC or GCC at slightly lower pH conditions in the ion exchange medium and subsequent removal of the solubilized calcium and/or removal of background dissolved calcium can inhibit or prevent the ASA hydrolyzation reaction. The reaction by-product is very sticky and fouls paper making felts, shower nozzles, and other machinery. Currently chemical additives such as aluminum compounds are deployed to mitigate the ASA hydrolyzation reaction with calcium. Elimination of the calcium can significantly reduce the need for aluminum compounds and increase the performance of the ASA.

Accordingly, in certain embodiments, the liquid input stream that is to be recovered can be selected such that the liquid input stream comprises calcium carbonate (e.g., in the form of PCC and/or GCC). In some such embodiments, the pH of the stream entering the ion exchange treatment step can be adjusted to or maintained at a pH at or below about 7.5, at or below about 7.2, or at or below about 7.1 (and/or, in certain embodiments, substantially below neutral, for example 5.5) during and/or prior to removing at least a portion of the cations using the ion exchange medium. In some such embodiments, adjusting or maintaining the pH of the liquid input stream comprises allowing the liquid input stream to contact the ion exchange medium, and allowing the operating pH of the ion exchange medium to reduce the pH of the liquid input stream (e.g., by using an acidic ion exchange medium, such as a WAC resin). In certain embodiments, allowing the lower operating pH of the ion exchange medium to reduce the pH of the feed stream can cause the calcium carbonate to dissolve and allow the ion exchange medium to take up the free calcium ions.

For example, in certain embodiments, the ion exchange medium can be configured to remove at least a portion of the ions from the liquid input stream (e.g., stream 105 in FIG. 1A), and, in some such embodiments, the recovery method comprises adjusting or maintaining the pH of the liquid input stream at or below about 7.5 (or at or below about 7.2, or at or below about 7.1, and/or, in certain embodiments, as low as, for example 5.5) such that at least a portion of the calcium carbonate is dissolved in the liquid input stream during and/or prior to removing at least a portion of the cations from the filtrate stream using the ion exchange medium. In some embodiments, the ion exchange medium can be configured to remove at least a portion of the ions from a supernatant stream (e.g., stream 215 in FIG. 2A, described in more detail below), and, in some such embodiments, the recovery method comprises adjusting or maintaining the pH of the supernatant stream at or below about 7.5 (or at or below about 7.2, or at or below about 7.1, and/or, in certain embodiments, substantially below neutral, for example 5.5) during and/or prior to removing at least a portion of the cations from the supernatant stream using the ion exchange medium. In certain embodiments, the ion exchange medium can be configured to remove at least a portion of the ions from a filtrate stream (e.g., stream 330 in FIG. 3, described in more detail below), and, in some such embodiments, the recovery method comprises adjusting or maintaining the pH of the filtrate stream at or below about 7.5 (or at or below about 7.2, or at or below about 7.1, and/or, in certain embodiments, substantially below neutral, for example 5.5) during and/or prior to removing at least a portion of the cations from the filtrate stream using the ion exchange medium. In any one or more of these embodiments, the pH of the input stream can be maintained or lowered by the ion exchange medium once the input stream has contacted the ion exchange medium, which can cause the calcium carbonate to dissolve and allow the ion exchange medium to take up the free calcium ions.

In addition to removing sparingly soluble ions from whitewater, the whitewater treatment systems described herein can also make use of various systems (including flocculation-based systems) to remove suspended solids and reduce the level of anionic colloidal material (i.e., anionic trash) within the whitewater stream. Anionic trash reduces the effectiveness of the paper dewatering process. This can result in an increased amount of steam/energy consumption at the dryer section of the paper machine when forced to dry a poorly dewatered paper sheet. In addition, limiting the amount of anionic trash within the whitewater reduces the overall chemical consumption of the whitewater recovery process. Specialized chemical additives (such as polyacrylamide and more common aluminum compounds) are often required to offset the presence of anionic colloidal trash. Anionic trash can reduce the reactivity with these specialized chemicals, making a portion of the chemical unavailable to react with the fibers. Thus, the specialty chemicals must often be added in excess. By controlling the anionic trash levels within the whitewater, the need to add excess specialty chemicals to control the anionic trash concentration is reduced. It was unexpectedly discovered that the use of flocculation prior to ion exchange can significantly reduce the amount of colloidal anionic particles within the whitewater.

The removal of solids and anionic trash can also enhance the degree to which the ion exchange process is able to remove multivalent ions from the whitewater. When ion exchange resins are employed, the ion exchange resin can act as a filter. If suspended solids are present they can be retained by the ion exchange resin (e.g., within the bed, if located within a packed column). Suspended solids trapped by the resin bed tend to accumulate at the interface between the ion exchange bed and the feed water entering the ion exchange column. Very fine solids can also penetrate into the ion exchange bead. The use of a cationic ion exchange resin (i.e., a resin that contains anions such that it is able to attract cations) diminishes the potential for fine solids penetration into the interstices of the resin as most of the fine particle have an anion charge and therefore repelled by the cationic resin. Solids accumulation in the ion exchange medium (e.g., in the ion exchange column and/or in and around distributors and other piping) results in an increase in the differential pressure in the ion exchange column, primarily resulting from clogging of the ion exchange resin and the water distribution and collection system inside the column. The increased differential pressure across the ion exchange bed can force the water to take the path of least resistance, circumventing the resin bed and traveling down the sides of the ion exchange column in a channeling fashion and thus avoiding intimate contact with the ion exchange resin. To operate most effectively, the ion exchange column should operate, in many instances, on a plug flow basis. If the fluid to be recovered does not receive proper intimate contact with the resin, the resin may be unable to effectively remove the dissolved contaminants.

Fine suspended solids can also clog the ion exchange resin. Mineral acid is commonly used to regenerate the resin for removal of contaminants. Suspended solids can block the passage of the chemical, preventing effective regeneration of the resin and reducing the proper removal of contaminants during the contaminant stripping process (regeneration).

Figure 2A:
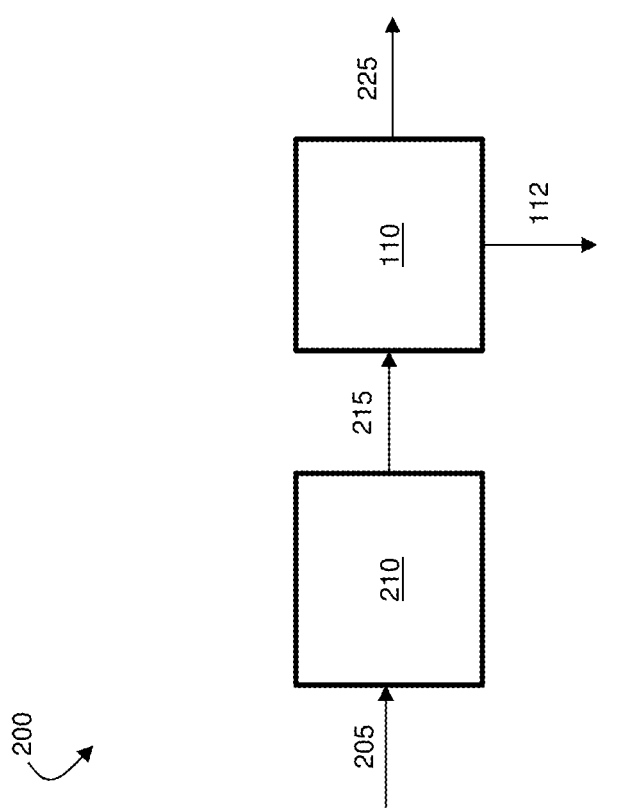
FIG. 2A is a schematic illustration of a whitewater recovery system including a flocculation step and an ion exchange step, according to some embodiments.

FIG. 2A is a schematic illustration of a system 200 in which a flocculation step is performed, along with an ion exchange step, to recover a whitewater stream. In FIG. 2A, liquid input stream 205, which comprises whitewater or is derived from whitewater and which contains cations and suspended solids, is exposed to a flocculent and, optionally in certain embodiments, a magnetically responsive material. Upon exposing the whitewater to the flocculent and in certain embodiments the magnetically responsive material, the suspended solids within the whitewater can interact with the flocculent and in certain embodiments the magnetically responsive material to form agglomerations of flocculent, including the magnetically responsive material in those embodiments employing magnetically responsive materials, and suspended solids, which can be removed. In certain embodiments, after the agglomerations have been formed, at least a portion of the agglomerations can be removed from the whitewater (e.g., using a magnet for embodiments employing magnetically responsive materials or any other suitable agglomeration removal apparatus such as a skimmer as appropriate for other embodiments) to produce a supernatant stream 215 containing less suspended solids than the liquid input stream 205. In embodiments in which magnets/magnetically responsive materials are employed, the magnet can be positioned within the flocculation vessel or within a separate vessel specifically dedicated to performing the magnetic separation step. In certain embodiments, one or more magnets and/or other agglomeration removal devices may be positioned such that they are at least partially submerged in the whitewater. In embodiments in which magnetically responsive material is employed, the presence of the magnetically responsive material within the agglomerations within the whitewater can cause agglomerations to be attracted to, and eventually stick to, the magnets. Subsequently, the agglomerations can be removed from the magnets, leaving purified whitewater behind.

A variety of types of flocculent can be used to form agglomerations with suspended solids. In certain embodiments, the flocculent comprises a polymeric flocculent. For example, the flocculent may be a polyacrylamide-based flocculent, in certain embodiments. In some embodiments, the flocculent comprises a polydiallyldimethylammonium chloride-based flocculent. Specific examples of polymeric flocculents suitable for use in the flocculation step include, but are not limited to, FLOPAM™ EM 140 CT, FLOPAM™ EM 240 CT, FLOPAM™ EM 340 CT, FLOPAM™ EM 340 BD, and FLOQUAT™ FL 4440. In certain embodiments, the flocculent can be non-polymeric. For example, in some embodiments, the flocculent comprises alum, aluminum chlorohydrate, aluminum sulfate, calcium oxide, calcium hydroxide, iron(II) sulfate, iron(III) chloride, sodium aluminate, and/or sodium silicate.

In embodiments in which the flocculation step comprises a magnetic-based flocculation step, a variety of types of magnetically responsive material can be used to form agglomerations with the suspended solids. Generally, the phrase "magnetically responsive material," as used herein, refers to any material capable of moving through an aqueous medium upon exposure of the material to a magnetic field. In certain embodiments, the magnetically responsive material is an iron-containing material, including materials containing elemental iron, oxides of iron, or any other iron-containing material. For example, the magnetically responsive material comprises magnetite ($Fe_3O_4$), in some embodiments. In certain embodiments, the magnetically responsive material is in the form of particles. The magnetically responsive particles can have any suitable average diameter that allows for easy integration into the whitewater recovery process (e.g., millimeter-scale diameters or smaller, in certain embodiments).

In embodiments comprising a magnetic-based flocculation step, a variety of types of magnets can be used to magnetically manipulate the agglomerations within the flocculation vessel. In certain embodiments, the magnet can be a permanent magnet, including but not limited to magnets comprising iron, nickel, cobalt, rare earth metals (including, for example, neodymium, praseodymium, samarium, gadolinium, and dysprosium), naturally occurring minerals (including, for example, lodestone), and/or alloys or other mixtures of these. In some embodiments, non-permanent magnets, such as electromagnets, may be used.

In FIG. 2A, liquid input stream 205 is exposed to the flocculent (and optional magnetically responsive material) within flocculation vessel 210. The use of a flocculation vessel is not required, and in other embodiments, whitewater can be exposed to flocculent (and optional magnetically responsive material) outside a vessel. In other embodiments, multiple flocculation vessels or stages may be employed.

Figure 2B:
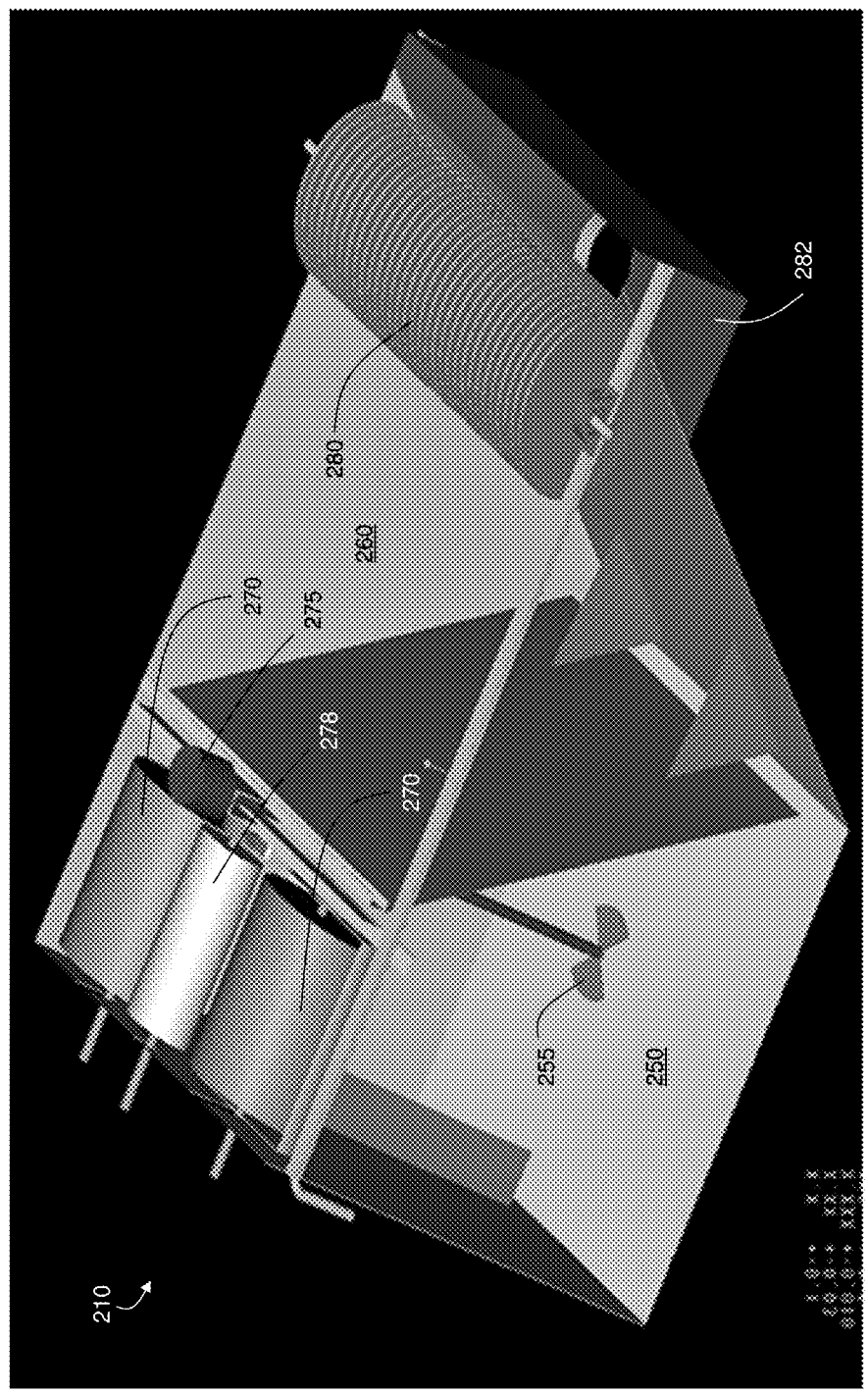
FIG. 2B is a schematic illustration of a flocculation vessel, according to certain embodiments.

FIG. 2B is a schematic illustration of an exemplary flocculation vessel 210, which can be used in association with certain embodiments described herein in which a magnetic-based flocculation step is performed. In FIG. 2B, flocculation vessel 210 comprises flocculation compartment 250, into which a magnetically responsive material, the whitewater, and the flocculent can be flowed. Upon flowing the magnetically responsive material, the whitewater, and the flocculent into the flocculation compartment, optional stirring apparatus 255 can be used to enhance the degree to which the magnetically responsive material, the whitewater, and the flocculent are mixed and become intimately contacted. After the magnetically responsive material, the whitewater, and the flocculent have mixed, suspended solids within the whitewater can form agglomerations with the magnetically responsive material and the flocculent. In certain embodiments, other ballast media can be used. For example, fine graded sand could be used as ballast media.

Upon formation of the agglomerations, some of the agglomerations can be separated from the whitewater using magnets 270. In FIG. 2B, magnets 270 comprise rotatable drums, discs, or screens arranged around elongated shafts, which can be rotated around their longitudinal axes. In other embodiments, the magnets may have other configurations. In certain embodiments, magnets 270 can be located at or near the input region of flocculation compartment 250 such that they are able to attract and attach to the agglomerations within the whitewater as it is agitated by stirring apparatus 255.

Many or all of the agglomerations that are not captured by magnets 270 continue to swirl in the flocculation compartment 250 and are eventually captured for recovery by magnets 270 at a later time. The flow of whitewater can force some of the agglomerations to be passed through the submerged weir in the direction of magnetic discs 280. The particles are however primarily forced to flow back into flocculation compartment 250 because magnetite is over five times denser than water. The relatively high density of the magnetite can greatly enhance the rate at which the agglomerations settle, allowing for much smaller flocculation vessel volumes (in certain embodiments, between 5 to 20 times smaller than traditional flocculation units sizes to purify a similar flow rate of water).

The agglomerations that are captured by magnets 270 can be scraped from the magnets using scraper 275 and subsequently transported back to flocculation compartment 250 once the dirt particles are removed using sheering discs 278.

Upon removing the agglomerations from the magnets, the magnetically responsive material can be mechanically detached from the suspended solids using a deagglomeration system. For example, in FIG. 2B, as agglomerations accumulate in agglomeration compartment 250, shearing discs 278 can be used to mechanically shear the agglomerations. As the agglomerations are sheared, the magnetically responsive material and water can be separated from the flocculent and the suspended solids. Suitable deagglomerators that can be used include, but are not limited to, Delumper® crushers available from Franklin Miller®, Livingston, N.J. and Silverson in-line mixers available from Silverson Machines, headquartered in Waterside, Chesham, United Kingdom.

After being separated using the shearing disc, the magnetically responsive material can be picked up using, for example, a magnet. Subsequently, the magnetically responsive material can be reused.

Fine flocculent and suspended solids that escape the retaining submerged weir are captured on magnetic discs 280 and can be scraped off and collected from a receiving trough 282 and returned to the flocculation chamber, after which the magnetically responsive material is recovered as described previously. Dirt particles and some polymer separated from the magnetically responsive material can be transferred to a solids dewatering system for removal of the solids using, for example, a belt press, a filter press, or other similar dewatering device. The resulting cake containing the suspended solids can be burned to provide energy to the process or discarded. The filtrate from the dewatering device can be recycled back to the flocculation vessel in certain embodiments, or further processed.

While the use of a magnetic-based flocculation step has been highlighted above, it should be understood that the flocculation step does not necessarily involve the use of magnets and/or magnetically responsive material, and in certain embodiments, non-magnetic-based flocculation may be performed. For example, in some embodiments, the flocculation step in system 200 of FIG. 2A comprises or includes a non-magnetic flocculation step, such as a flocculation step in which sand or other non-magnetic materials are used as the ballast. In one such set of embodiments, flocculation vessel 210 comprises a gas input configured to inject gas into fluid contained within flocculation vessel 210. During the flocculation step, gas can be introduced into the whitewater input stream. The gas can be dissolved in the whitewater under pressure and subsequently released at atmospheric pressure in a tank or basin, which can lead to the formation of gas bubbles. In some such cases, agglomerations adhere to the boundaries of the gas bubbles formed within the whitewater such that the agglomerations rise to the top of the whitewater as the gas bubbles rise. In certain such embodiments, flocculation vessel 210 comprises a dissolved gas flotation separation apparatus, such as a dissolved air flotation separation apparatus. Examples of suitable dissolved air flotation apparatus include, for example, the PPM® DAF Clarifier and the Saturn™ DAF Clarifier manufactured by Poseidon (Outremont, Québec, Canada), and the Krofta DAF recovery system by Ecolab (St. Paul, Minn.). Examples of other suitable dissolved gas flotation apparatus include, for example, the Dissolved Gas Flotation (DGF) system, the Cyclosep™ flotation system, the Hydrocell® induced gas flotation separator, and the VORSEP™ compact flotation unit, available from Siemens Water Technologies (Broussard, La.).

In certain embodiments, flocculation vessel 210 is configured to allow at least a portion of the agglomerations of flocculent and suspended solids to settle to the bottom of the vessel. In such embodiments, the agglomerations can be separated from the whitewater by gravity settling at least a portion of the agglomerations, and scraping or otherwise removing the settled solids from the bottom of the vessel. In some such embodiments, flocculation vessel 210 comprises a gravity settling clarifier. Suitable devices for performing various of the flocculation methods described herein include, but are not limited to, Reactivator® clarifiers available from Graver Water Systems, Inc. (Cranford, N.J.); circular clarifiers and industrial wastewater clarifiers available from Monroe Environmental Corporation (Monroe, Mich.); and RapiSand™ ballasted flocculation systems from WesTech (Salt Lake City, Utah).

In some embodiments, a combination of magnetic-based and non-magnetic-based flocculation steps can be performed.

In certain embodiments, the flocculation system is capable of recovering a purified water stream that includes at least 90%, at least 95%, or at least 98% of the whitewater that enters the flocculation vessel (e.g., from stream 205) while removing at least 70%, at least 90%, at least 95%, or at least 98% of the suspended solids from the whitewater that enters the flocculation vessel.

In certain embodiments, after at least a portion of the suspended solids have been removed from the whitewater stream within the flocculation vessel, the processed whitewater can be further processed using an ion exchange medium. For example, in FIG. 2A, supernatant stream 215 is flowed through ion exchange vessel 110. Upon flowing supernatant stream 215 through ion exchange vessel 110, at least a portion of the cations can be removed from the supernatant stream using an ion exchange medium. Removing at least a portion of the cations from supernatant stream 215 can produce an ion exchanged effluent stream 225.

The ion exchange medium used in the ion exchange step of FIG. 2A can be similar to the ion exchange medium described above with respect to FIG. 1A. For example, in certain embodiments, the ion exchange medium comprises a weak acid cation resin or a strong acid cation resin. Moreover, the configuration of the equipment used to perform the ion exchange step in FIG. 2A can be similar to the configurations of the ion exchange step shown in FIG. 1A. For example, in certain embodiments, at least a portion of supernatant stream 215 can be flowed through an ion exchange vessel 110 containing the ion exchange medium. The ion exchange vessel comprises, in some embodiments, a packed column. As noted above, the use of an ion exchange vessel is not required, and in other embodiments, the supernatant stream 215 can be exposed to ion exchange medium outside a vessel.

Figure 3:
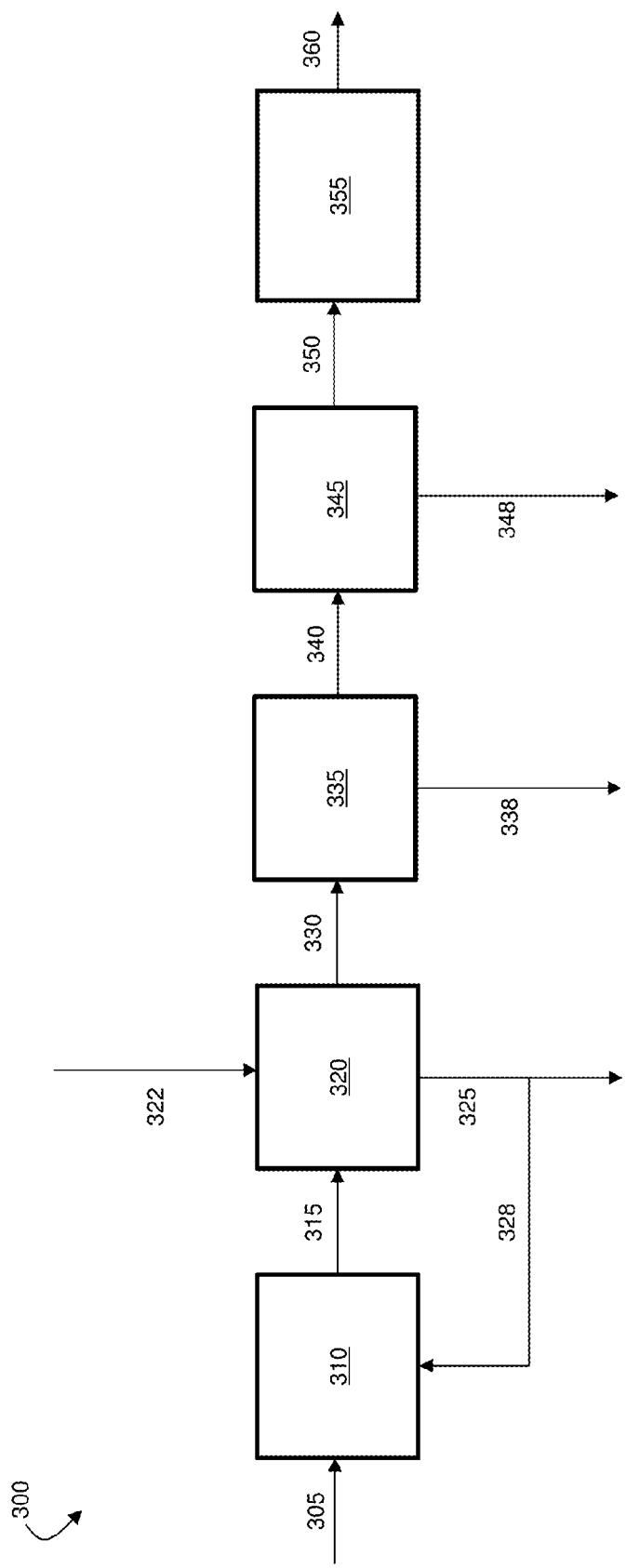
FIG. 3 is, in accordance with certain embodiments, a schematic illustration of a whitewater recovery system.

Operation of the ion exchange medium exposure step in FIG. 2A can be similar to that of the ion exchange step described with respect to FIG. 1A. For example, the ion exchange medium in ion exchange vessel 110 in FIG. 2A can be used to remove a large percentage of the cations (e.g., multivalent cations such as any one or more of $Mg^{2+}$, $Ca^{2+}$, $Sr^{2+}$, $Ba^{2+}$, $Fe^{2+}$, $Mn^{2+}$, and/or $Al^{3+}$) to a relatively large degree (e.g., such that the amount of cations within ion exchanged effluent stream 225 is at least about 70% lower, at least about 80% lower, at least about 90% lower, at least about 95% lower, or at least about 99% lower than the amount of cations within stream 215). In some embodiments, the step of removing at least a portion of the cations from supernatant stream 215 using an ion exchange medium is performed at a pH of between about 4.5 and about 6.5. In certain embodiments, the ion exchange step and/or the flocculation step can be combined with additional processing steps to enhance the degree to which suspended solids and/or ions are removed from the whitewater. FIG. 3 is a schematic diagram illustrating an exemplary whitewater recovery system 300 including such additional components. System 300 is configured to process liquid input stream 305, which can contain whitewater or be derived from whitewater. Liquid input stream 305 can contain suspended solids, such as wood fiber, pulp, colloidal material (including, potentially, anionic colloidal trash), and the like. In certain embodiments, liquid input stream 305 contains anions and/or cations (e.g., multivalent cations such as any one or more of $Mg^{2+}$, $Ca^{2+}$, $Sr^{2+}$, $Ba^{2+}$, $Fe^{2+}$, $Mn^{2+}$, and/or $Al^{3+}$).

In FIG. 3, liquid input stream 305, comprising whitewater or derived from whitewater, can be exposed to a flocculent. The flocculent can be configured to agglomerate with the suspended solids within the whitewater upon exposure of the flocculent to the whitewater. Accordingly, when liquid input stream 305 is exposed to the flocculent, agglomerations of flocculent and suspended solids can be formed. In certain embodiments, the flocculent exposure step can be carried out in a flocculation vessel 310, which can contain the flocculent and can be configured to accept an input flow of the whitewater (e.g., through one or more inlets). The flocculation step can be configured to produce a supernatant stream 315 comprising purified liquid containing a lower quantity of suspended solids than liquid input stream 305, for example, by removing at least a portion of the agglomerations of flocculent and suspended solids from liquid input stream 305.

In certain embodiments, the flocculation step in FIG. 3 comprises a magnetic-based flocculation step, such as the magnetic-based flocculation step described in association with FIG. 2A. In such cases, the flocculation vessel can contain magnetically responsive material configured to form agglomerations with the flocculent and the suspended solids. In embodiments in which a magnetic-based flocculation step is employed, the flocculation step can be configured in any of the ways described above with respect to FIG. 2A (e.g., using a magnet to separate the agglomerations of suspended solids, flocculent, and magnetically responsive material from the whitewater). In addition, the magnetically responsive material used in such a step can correspond to any of the magnetically responsive materials (e.g., magnetite) described above with respect to FIG. 2A.

In some embodiments, the flocculation step in system 300 of FIG. 3 comprises or includes a non-magnetic-based flocculation step, including any of the non-magnetic-based flocculation steps described above in association with FIG. 2A. In some embodiments, a combination of magnetic-based and non-magnetic-based flocculation steps can be performed.

System 300 can further comprise a filter 320 configured to receive at least a portion of supernatant stream 315. Filter 320 can be configured to filter supernatant stream 315 to produce a retentate stream 325 and a filtrate stream 330. Filter 320 comprises, according to certain embodiments, a porous medium through which supernatant stream 315 can be flowed, leaving behind suspended solids (which can form part of and/or subsequently be transported away as retentate stream 325) and producing filtrate stream 330 on the other side of the porous medium. In such embodiments, filtrate stream 330 generally contains a lower quantity of suspended solids than the retentate stream.

A variety of devices are suitable for use as filter 320. Filter 320 comprises, in certain embodiments, a plurality of discs stacked on top of each other, and oriented horizontally or vertically. Optionally, the discs can be rotated during filtration. Water can be transported through the discs, leaving suspended solids behind. In certain embodiments, a pressure gradient can be applied across the discs, enhancing separation. In certain embodiments, filter 320 comprises a disc filter such as the Petax™ disc filter, manufactured by Kadant, Inc. (Westford, Mass.)

In some embodiments, filter 320 comprises a screen filter. Generally, screen filters include a mesh, perforated material, fabric, or other filtration element. In certain such embodiments, a pressurized screen filter can be used. When pressurized screen filters are employed, during filtration, fluid may be pressurized and fed through the filtration element. Optionally, after a predetermined pressure drop is established across the filtration element, a backwashing sequence can be initiated to clean the filtration element. Examples of suitable screen filters include, but are not limited to, the MegaFlow™, Pulse Purge™, and ErGo™ pressurized screen filter systems from Kadant, Inc.

Filter 320 comprises, in certain embodiments, a strainer. For example, filter 320 can comprise a gravity strainer. In such strainers, whitewater can be transported through a mesh, perforated material, fabric, or other filtration element using gravity as a driving force. Examples of suitable gravity strainers include Kadant gravity strainer models GS 4005, GS 4015, GS 4025, GS 4035, and GS 4045. In certain embodiments, a vacuum assisted gravity strainer can be employed, such as Kadant models VA 05, VA 15, VA 25, VA 35, and VA 45. In vacuum assisted gravity strainers, a vacuum is applied to the filtrate side of the filtration element, which enhances the rate at which fluid is drawn through the filtration element.

In certain embodiments, filter 320 comprises a depth filtration medium, such as sand (e.g., in the form of graded layers of sand gravel) and/or other filter media. The whitewater can be transported from a first side of the depth filtration medium to a second side of the depth filtration medium, leaving behind suspended solids within the bulk of the filtration medium, and producing purified whitewater on the second side of the filtration medium.

The suspended solids captured by filter 320 can be removed from the filter via retentate stream 325. Filter 320 can be configured, in some embodiments, such that at least a portion 328 of retentate stream 325 is recycled to flocculation vessel 310. This can be achieved, for example, by flowing a stream of water (e.g., via stream 322) through the filter to remove the retained solids, and subsequently transporting at least a part of the resulting suspension (e.g., all or part of the liquid portion of the suspension) to the flocculation vessel. In some such embodiments, portion 328 of the retentate portion of the processed whitewater is used to form a suspension of agglomerations within flocculation vessel 310. By using filter 320 to capture suspended solids in this way, the transportation of the suspended solids to downstream operations (e.g., ion exchangers, dissolved solids removal apparatus, etc.)—which can become clogged or are otherwise sensitive to the presence of suspended solids—can be prevented.

In certain embodiments, system 300 comprises an ion exchange vessel 335 configured to receive at least a portion of filtrate stream 330. Ion exchange vessel 335 can contain an ion exchange medium configured to remove at least a portion of the cations (e.g., multivalent cations such as $Mg^{2+}$, $Ca^{2+}$, $Sr^{2+}$, $Ba^{2+}$, $Fe^{2+}$, $Mn^{2+}$, and/or $Al^{3+}$) from filtrate stream 330 to produce ion exchanged effluent stream 340. The multivalent ions can be removed from the ion exchange medium (e.g., using any of the ion exchange medium regeneration steps described elsewhere) via stream 338.

The ion exchange medium used in the ion exchange step of FIG. 3 can be similar to the ion exchange medium described above with respect to FIGS. 1A and 2A. For example, in certain embodiments, the ion exchange medium comprises a weak acid cation resin or a strong acid cation resin. Moreover, the configuration of the equipment used to perform the ion exchange step in system 300 can be similar to the configurations of the ion exchange steps illustrated in FIGS. 1A and 2A. For example, in certain embodiments, ion exchange vessel 335 can be in the form of a packed bed, through which at least a portion of filtrate stream 330 can be flowed to remove cations from the filtrate stream. As noted elsewhere, the use of an ion exchange vessel is not required, and in other embodiments, filtrate stream 330 can be exposed to ion exchange medium outside a vessel. Finally, operation of the ion exchange step in FIG. 3 can be similar to that of the ion exchange steps described with respect to FIGS. 1A and 2A. For example, the ion exchange medium in ion exchange vessel 335 in FIG. 3 can be used to remove a large percentage of the cations (e.g., multivalent cations such as any one or more of $Mg^{2+}$, $Ca^{2+}$, $Sr^{2+}$, $Ba^{2+}$, $Fe^{2+}$, $Mn^{2+}$, and/or $Al^{3+}$) to a relatively large degree (e.g., such that the amount of cations within ion exchanged effluent stream 340 is at least about 70% lower, at least about 80% lower, at least about 90% lower, at least about 95% lower, or at least about 99% lower than the amount of cations within filtrate stream 330). In some embodiments, the step of removing at least a portion of the cations from filtrate stream 330 using an ion exchange medium is performed at a pH of between about 5.5 and about 8.5.

System 300 further comprises, in certain embodiments, optional total dissolved solids removal apparatus 345. Total dissolved solids removal apparatus 345 can be configured to receive at least a portion of the processed whitewater contained within ion exchange vessel 335. Apparatus 345 is generally configured to reduce the amount of total dissolved solids within stream 340. For example, when stream 340 is transported through total dissolved solids removal apparatus 345, at least a portion of the total dissolved solids within stream 340 (i.e., the dissolved solids remaining in the processed whitewater after the ion exchange step has been performed) can be removed to produce stream 350, which contains dissolved solids in amount less than the amount in stream 340. In certain embodiments, total dissolved solids removal apparatus 345 is configured to remove anions from stream 340 such that the amount of anions within stream 350 is lower than the amount of anions within stream 340.

A variety of apparatus are suitable for use in removing dissolved solids from stream 340. In certain embodiments, total dissolved solids removal apparatus 345 is configured to perform reverse osmosis. Reverse osmosis is a membrane-based filtration method in which large molecules and ions can be removed from solution by applying pressure to the solution when it is on one side of a selective membrane, resulting in solute (containing the ions/molecules) being retained on the pressurized side of the membrane and solvent passing through the membrane. Suitable membranes for use in reverse osmosis apparatuses include, but are not limited to, those available from Dow Chemical Company's Filmtec Division in Midland, Mich. (e.g., BW 30-400/44 I, BW-30-400i, LE-400, and SW-400-FR) and those available from Koch Membranes in Wilmington, Mass. (e.g., TFC-HR 8 inch, TFC HF MegaMagnum, and TFC-SW MegaMagnum). In certain embodiments, the reverse osmosis unit can be operated at relatively high temperatures (e.g., greater than 110° F.), to facilitate recovery of the heat energy in the whitewater. The application of heat can reduce the rejection of dissolved solids while allowing the reverse osmosis unit to operate at a higher flux.

In some embodiments, total dissolved solids removal apparatus 345 is configured to perform nanofiltration. Nanofiltration generally refers to a process in which a relatively low amount of pressure (e.g., up to 3 MPa) is used to transport fluid through a membrane comprising nanoscale pores (e.g., pores with diameters of 100 nanometers or less, often with diameters of around 1 nanometer). Generally, nanofiltration uses smaller pressures and membranes with larger pore sizes compared to those used in reverse osmosis process. Suitable membranes for use in nanofiltration apparatuses include, but are not limited to, those available from Dow Chemical Company's Filmtec Division in Midland, Mich. (e.g., NF90-400 and NF270-400) and those available from Koch Membranes in Wilmington, Mass. (e.g., TFC-SR 100-330 and TFC SR-400).

In certain embodiments, total dissolved solids removal apparatus 345 is configured to perform a second ion exchange process. The second ion exchange process can be configured to remove anions from the whitewater. The second ion exchange process can be fabricated by immobilizing an ion exchange medium within a vessel, for example, in the form of a packed column. One of ordinary skill in the art, given the present disclosure, would be capable of selecting an appropriate ion exchange resin for removal of a particular anion from a whitewater stream. Examples of ions that can be removed from the whitewater include, but are not limited to, $Cl^-$, $SO_4^{2-}$, $NO_3^-$, $PO_4^{-3}$, $SiO_2$, $CO_2$, and $OH^-$. Examples of ion exchange media that could be used to remove such ions include, but are not limited to, MP 64, MP 62, M-504, and MP 600 (available from Bayer's Lanxess division in Pittsburgh, Pa.) and SBR-P, MWA-1, and IRA 910 (available from Dow Chemical Company in Midland, Mich.).

Generally, total dissolved solids removal apparatus 345 is positioned downstream of the flocculation, filtration, and ion exchange units. By positioning the total dissolved solids removal apparatus downstream of these units, one can ensure that suspended solids (including anionic colloidal trash and suspended organic material) and ions that cause scaling—both of which can plug and foul the components of the total dissolved solids removal apparatus—are removed from the whitewater prior to the whitewater being transported through the total dissolved solids removal apparatus. Such upstream removal of suspended solids and scale causing ions can dramatically reduce component fouling and the need for component cleaning, and can lead to high water recovery rates for the total dissolved solids removal system.

In certain embodiments, a stream of water can be used to transport the solids and ions captured by the total dissolved solids removal apparatus away from the apparatus, for example, via stream 348 in FIG. 3. Because the water within stream 348 is low in suspended solids and scale forming ions, this stream can be recycled directly to certain parts of the papermaking process without the need for further purification. For example, warm dissolved solids removal apparatus reject water can be used for flushing systems at the paper or pulp mill. In some embodiments, stream 348 can be introduced to a second total dissolved solids removal apparatus stage (e.g., a second reverse osmosis unit, or other suitable unit) for further purification. Incorporating additional total dissolved solids removal apparatuses would increase the overall recovery rate of the combined units.

In certain embodiments, system 300 comprises optional electromagnetic radiation exposure system 355. Electromagnetic radiation exposure system 355 can be configured to expose recovered whitewater from the ion exchange vessel to electromagnetic radiation. While electromagnetic radiation exposure system 355 is illustrated in FIG. 3 as receiving fluid directly from dissolved solids removal apparatus 345, in other embodiments, the order of electromagnetic radiation exposure system 355 and total dissolved solids removal apparatus 345 may be switched, and in still other embodiments, total dissolved solids removal apparatus 345 may not be present at all. That is to say, in certain embodiments, electromagnetic radiation exposure system 355 can be configured to receive a liquid stream directly from ion exchange vessel 335 or directly from dissolved solids removal apparatus 345.

Electromagnetic radiation exposure system 355 can be configured to expose the liquid within stream 350 to at least one wavelength of ultraviolet electromagnetic radiation (e.g., electromagnetic radiation with a wavelength of from about 10 nm to about 400 nm), in certain embodiments. The whitewater in a process stream can be exposed to electromagnetic radiation, for example, by including a region in the conduit through which the whitewater is transported that is transparent to the wavelength(s) of electromagnetic radiation that are to be used to process the whitewater. For example, an optical window that is transparent to, for example, ultraviolet electromagnetic radiation can be included in a conduit through which white water is transported.

In some embodiments, electromagnetic radiation exposure system 355 sterilizes or reduces the bio burden of the whitewater. As one particular example, ultraviolet electromagnetic radiation can be used to destroy DNA, kill or otherwise render bacteria non-viable, or otherwise sterilize the whitewater within stream 350. In certain embodiments, electromagnetic radiation exposure system 355 comprises one or more amalgam ultraviolet lamps, such as those manufactured by Heraeus Noblelight GmbH, Hanau, Germany. The use of electromagnetic radiation to control bacteria and slime may allow for significantly reduced use of biocides and slimacides—some of which are poisonous—in the whitewater loop(s). The electromagnetic radiation exposure step can be located downstream of the ion exchange process and/or the total dissolved solids removal apparatus (and, in certain embodiments, at the end of the whitewater recovery process) in order to facilitate the most efficient transmittance of electromagnetic radiation (and especially ultraviolet electromagnetic radiation) through a processed whitewater stream.

In some embodiments, recovery heat exchangers can be placed at various locations within the system. The recovery heat exchangers may be used to remove heat from the whitewater and/or processed whitewater and subsequently pre-heat input streams (such as fresh make-up water streams) to appropriate temperatures. The use of recovery heat exchangers can reduce the total amount of energy required to operate the water recovery system.

Figure 4A:
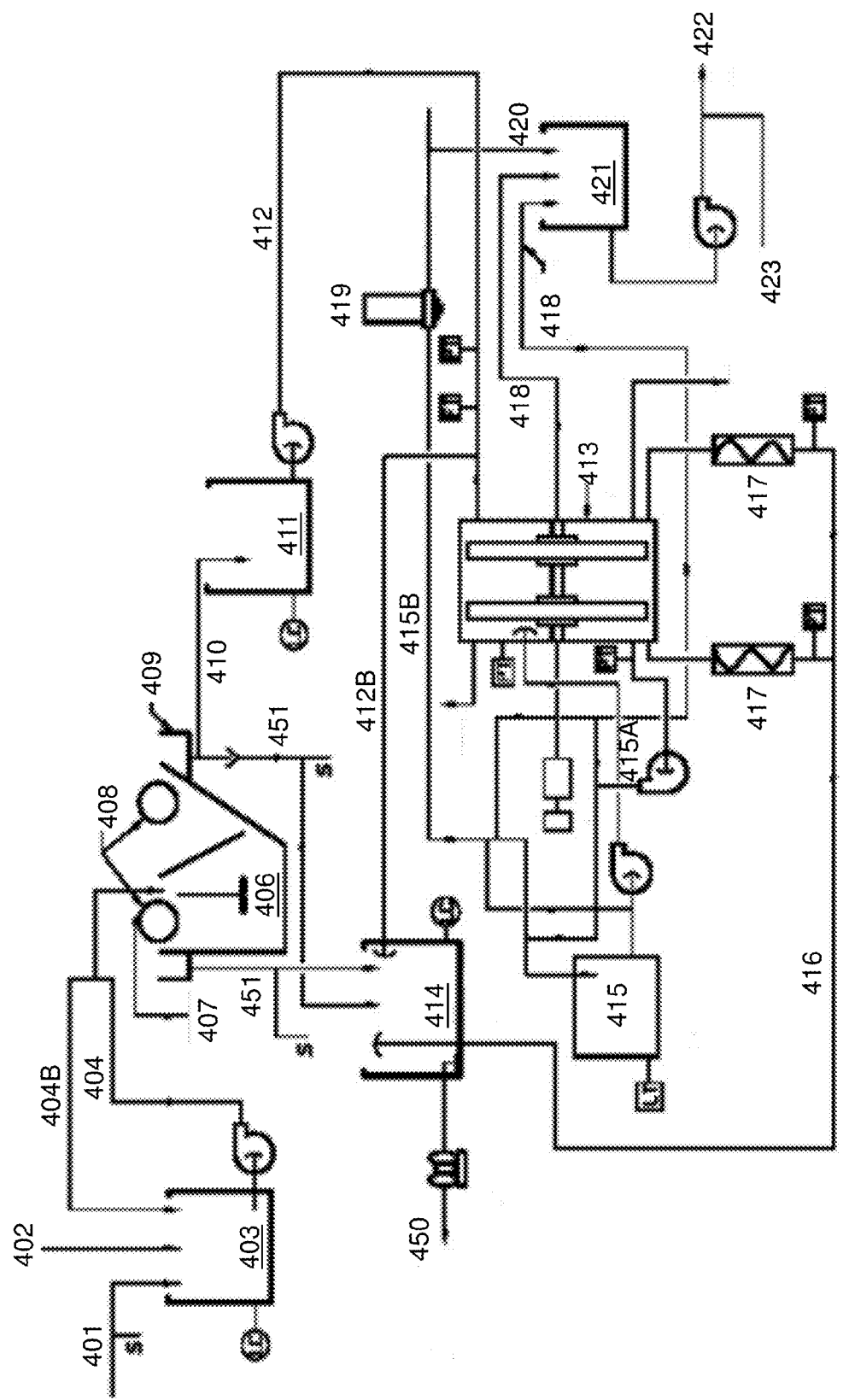
FIGS. 4A-4C are schematic illustrations of a whitewater recovery system and process, according to certain embodiments.
Figure 4B:
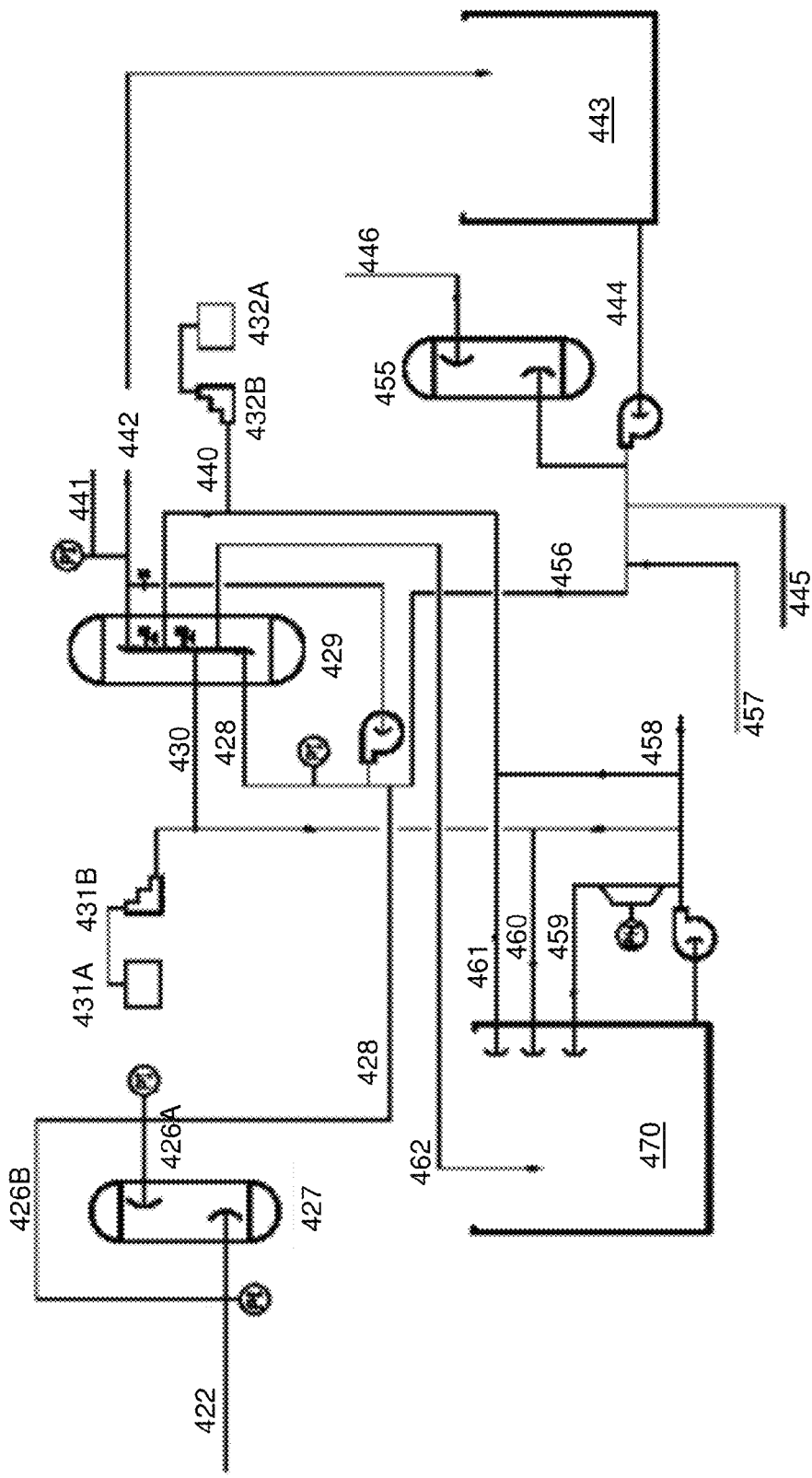
Figure 4C:
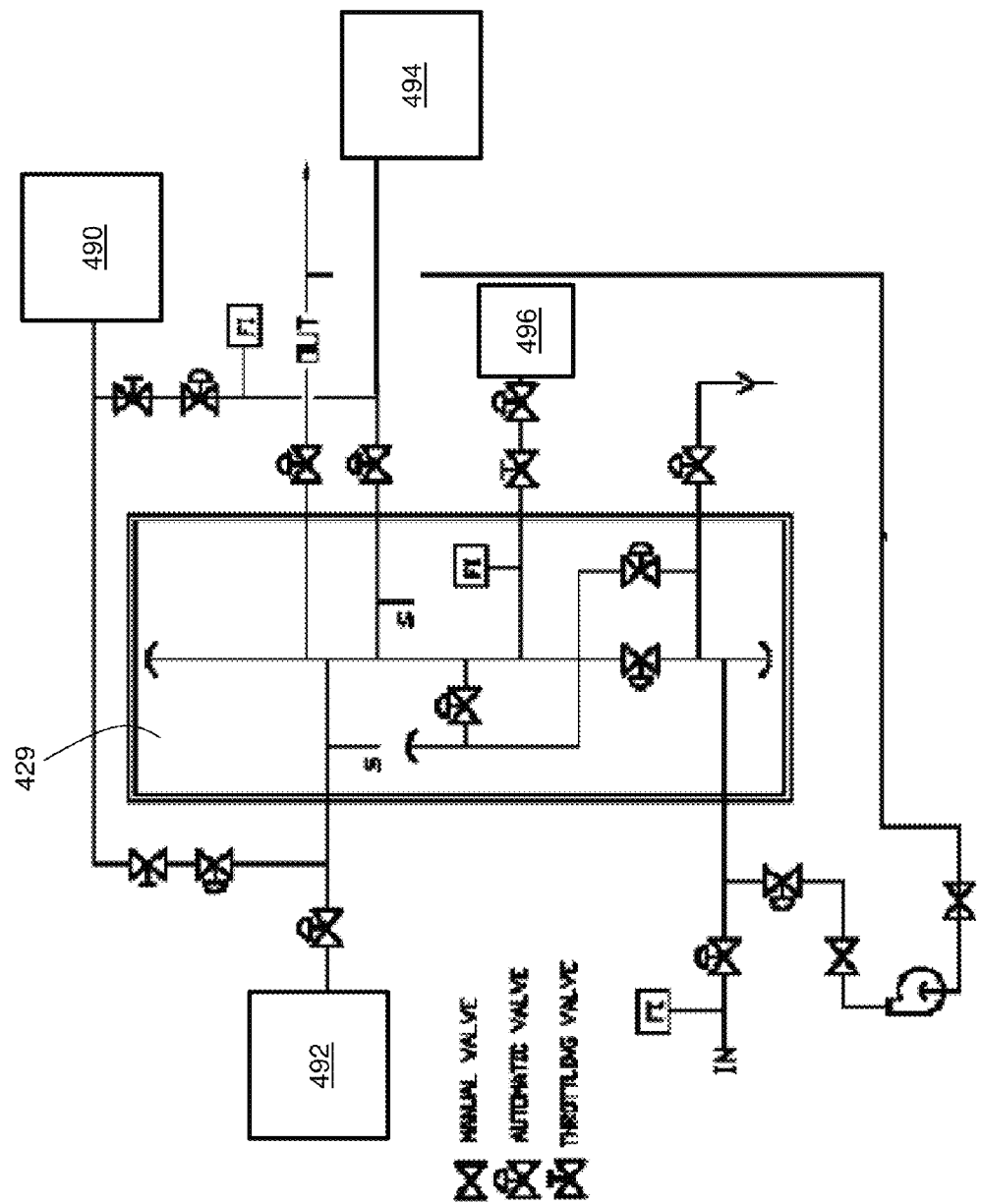

FIGS. 4A-4C are schematic illustrations of another exemplary system that can be used to remove suspended solids and multivalent ions from whitewater. In FIG. 4A, whitewater stream 401 is mixed with polymer flocculant within stream 402 and transported to tank 403. Upon mixing the whitewater stream with the flocculant, the mixture is transported out of tank 403 via stream 404. In certain cases, a portion of stream 404 is recycled back to tank 403 via stream 404B. The whitewater and flocculant mixture within stream 404 is transported to an optional magnetic ballast tank 406, where suspended solids are removed. Optional magnetic ballast tank 406 can be configured in a similar manner as the system illustrated in FIG. 2B. Water within stream 407 can be transported to optional magnetic ballast tank 406 to assist in capture of the magnetically responsive ballast material on magnets 408. In certain embodiments, non-magnetic-based flocculation steps (e.g., using any of the processes or equipment described elsewhere herein) can be performed in addition to or in place of the magnetic-based flocculation step illustrated in FIG. 4A.

Processed water from tank 406 can be captured in trough 409 and subsequently transferred to collection tank 411 via stream 410. Sludge produced during the suspended solids removal step within tank 406 can be transported to sludge tank 414 via streams 451. The sludge within tank 414 can be removed via stream 450 and subsequently dewatered and/or disposed of.

The contents of tank 411 can be transported via stream 412 to disc filter 413. In certain cases, a portion of stream 412 can be transported to sludge tank 414 (e.g., via stream 412B). Vacuum pumps can be used to draw a vacuum on the filters within disc filter 413, producing filtrate stream 418, which can be subsequently transported to collection tank 421 for further processing.

The system can include a disk washing apparatus 415, which can be configured to transport rinsing agents over the filters within disc filter 413. For example, rinsing agents can be pumped via stream 415A into disc filter 413. Vacuum pumps 417 can subsequently be used to draw the solids to the filter media and spray showers can be used to remove the accumulated cake solids. Effluent from the disk washing process can be transported out of the system, for example, into sludge tank 414 (e.g., via stream 416) or into collection tank 421 (e.g., via stream 420), optionally first being filtered using filter 419.

As noted above, the contents of collection tank 421 can be further processed to remove other contaminants from the whitewater. For example, a portion of the contents of tank 421 can be transported via stream 423 to tank 406 and/or tank 411 for further processing. A portion of the contents of tank 421 can be transported via stream 422 to an ion exchange process. FIG. 4B is a schematic illustration outlining the ion exchange processing of whitewater within stream 422. In FIG. 4B, the contents of stream 422 can be transported to optional cartridge filter 427, which can be used to remove residual suspended solids that remain within stream 422 and guard against upsets from the disc filter to produce cartridge filter effluent stream 426A. In certain cases, some or all of the contents of stream 422 can bypass cartridge filter 427 via stream 426B, for example, for maintenance. In embodiments in which a cartridge filters employed, the effluent from the cartridge filter and or the bypass stream can be transported to an ion exchange column 429 via stream 428. Ion exchange column 429 can be packed with an ion exchange resin, which can be used to substitute multivalent ions within stream 428 with monovalent ions from the ion exchange medium. After the ion exchange process has been completed, the processed water to be transported via stream 442 to effluent tank 443. Subsequently, the contents of tank 443 can be transported out of tank 443 via stream 444. In some cases, a portion of the contents of stream 444 can be transported back to the paper making process via stream 445.

The ion exchange column can be regenerated, for example, by washing the ion exchange medium with acidic and alkaline solutions. For example, in FIG. 4B, sulfuric acid within vessel 431A can be pumped via pump 431B and transported to the ion exchange column via stream 430, as part of an ion exchange medium regeneration process. In addition, sodium hydroxide solution or another suitable alkaline solution from vessel 432A can be pumped using pump 432B to ion exchange column 429 via stream 440 as part of an ion exchange medium neutralization process. Optionally, water can be added to the ion exchange medium during the regeneration process. For example, fresh water within stream 446 can be transported through water softener 455 and subsequently transported to the ion exchange medium via stream 456. In certain embodiments, a portion of processed whitewater within stream 444 can be transported to the ion exchange medium via stream 456, in addition to or in place of the fresh water from water softener 455. Waste water from the ion exchange regeneration process can be transported to collection tank 470, for example, via stream 462.

In FIG. 4B, stream 459 can be used as a common recirculation line for mixing the acid and caustic waste from the ion exchange system. Streams 460 and 461 can also be included in the system. In certain embodiments, streams 460 and 461 are part of a tank recirculation system and receive additional acid or caustic for neutralization of tank 470 based on the pH of the neutralization tank. Stream 458 can be included, in certain embodiments, as a pressurized drain from discharge tank 470, for example, to a mill wastewater treatment plant. In some embodiments, streams 457 and 445 can be included, which are system discharges. In some embodiments, one of stream 457 and 445 can be routed back to the mill for reuse and the other can be routed to the optional reverse osmosis system.

The fresh water softening step can be eliminated, for example, in certain embodiments in which hydrochloric acid or similar acid is used in place of sulfuric acid. This can be preferable in certain embodiments in which iron is present in the whitewater. In such a system, units 443 and 455 and stream 444 could be eliminated, and discharge line 441 could be primarily used.

In some embodiments, rather than being directly transferred from ion exchange column 429 to effluent tank 443, at least a portion of the whitewater within stream 442 can be subjected to a total dissolved solids removal step and/or an ultraviolet radiation exposure step (e.g., by being transported through stream 441), and subsequently transported to effluent tank 443.

In certain embodiments, an acid/alkaline rinsing arrangement can be used to regenerate exhausted ion exchange medium. One exemplary process for regenerating the exhausted ion exchange medium is illustrated in FIG. 4C. Upon exhaustion of the ion exchange medium within column 429, the column can be removed from service and stand-by ion exchange units can then be placed in service. Regeneration of the exhausted ion exchange unit can be performed, for example, by first introducing acid from acid source 494 (e.g., a dilute mineral acid) in a down flow acid introduction step. Next, water (e.g., from water source 490) can be used to displace the acid in a down flow displacement step. The water that is used to displace the acid can be fresh water (e.g., in certain embodiments in which hydrochloric acid is used in the wash step) and/or softened water (e.g., in certain embodiments in which sulfuric acid is used in the wash step) can be used. Next, a caustic liquid (e.g., dilute NaOH) from caustic source 492 can be used to rinse (and, for example, neutralize) the column, for example, in an up flow caustic rinse step. Finally, an air mix step can be performed using air from source 496 to uniformly distribute resins to establish a near neutral operating pH of the ion exchange material and the product water. After regeneration of the ion exchange medium, the column can be returned to the process for use.

Various systems and methods described herein may provide a variety of advantages compared to prior art whitewater recovery system. For example, the use of flocculation and/or ion exchange processes may allow for a reduction of scaling through the elimination of multivalent cations that result in precipitation of sparingly soluble salts when combined with their counter ions (such as sulfate or carbonate) to form scaling precipitates. The use of a flocculation step (e.g., a magnetic-based flocculation step and/or a non-magnetic based flocculation step, such as dissolved gas flotation or similar sedimentation or flotation clarifier steps) may result in the reduction of the amount of anionic colloidal substances (i.e., anionic trash) within the whitewater. This may allow for a substantial reduction in the use of chemical additives (which are often employed, for example, for fiber retention but are themselves consumed by the anionic trash) within the paper making process. In addition, the use of an ion exchange process for the removal of scale-forming ions may further reduce the need to add chemical reagents to control scale-forming ions. Removal of the scale-forming ions and anionic trash can decrease paper machine draw issues, increase the surface tension of the water used to form the paper (thereby increasing the wet strength of the paper), improve the bonding of paper fibers used in the papermaking process, enhance paper thickness uniformity, and increase paper brightness.

One particular example of chemical additive reduction relates to papermaking processes in which alkylsuccinic acid anhydride (ASA) is employed. ASA is used as a sizing agent and is often introduced at the head box of the paper machine. The presence of $Ca^{2+}$ and other multivalent cations can cause ASA to rapidly hydrolyze. The hydrolysis product of ASA and $Ca^{2+}$ is sticky and can cause fouling of the paper machine, paper products and felts. To minimize the formation of the hydrolysis reaction by-product, control of the concentration of $Ca^{2+}$ concentration is important. The current technology for control of the ASA hydrolysis reaction by-products is the addition of aluminum salts. Certain embodiments of the inventive systems and methods described herein, however, can virtually eliminate the need to add aluminum salts to control the fouling of the ASA hydrolysis byproduct. This results in the reduction of the amount of aluminum salt added to the system, a decrease in the need for excess ASA addition to compensate for hydrolysis reactions with $Ca^{2+}$ (and enhanced performance of the ASA that is added), a decrease in fouling from calcium-based scale, and reduced downtime of the papermaking apparatus for cleaning and maintenance.

Another particular example of chemical additive reduction relates to papermaking processes in which polyamidoamine-epichlorohydrine (PAAE) is employed. The use of polyamidoamine-epichlorohydrine (PAAE) is common in tissue production for increasing wet strength and for its capabilities to perform in a broad pH range (5-8) and for the reduction in the use of carcinogenic formaldehyde based resins of the past. The amine group as a cationic species is able to control adverse effects from the presence of anionic trash in cycled whitewater. Chemical manufactures suggest concentrations as high as 1% can be used for the anionic trash control. Dosages of 1% (Based on Dry Fiber) or less does not commonly support wet strength functionality. Normal wet strength functionality is achieved at PAAE concentrations of 2 to 8% for tissue and corrugated products that require wet strength. Qualitatively, if one considers that ⅛ to ½ of the PAAE is consumed by the anion trash the cost of the PAAE for its intended function is significantly affected by the presence of anion trash in a cycled whitewater. Accordingly, reduction or elimination of anionic trash in the whitewater loops will contribute to a chemical cost savings when using PAAE. Globally, the reduction in the use of PAAE also results in the reduction of some of the adverse by-products from the use of PAAE such as dichloropropanol (DCP) and monodichloropropandiol MCPD). DCP and MCPD are recognized chloro-organic monomers (AOX—Absorbable Organic Halide) and are toxic to the environment and thus often regulated.

Certain embodiments of the inventive systems and methods can also reduce or eliminate the need for biocides and slimacides, many of which are poisonous, through the use of electromagnetic radiation-based biological material elimination or through the use of ozone.

Certain embodiments of the systems and methods described herein can also be used to reduce the amount of fresh water used in common papermaking processes that treat and discharge (instead of recycling) whitewater, while producing only a minimal amount of sludge. In addition, heat may be recovered from various points of the whitewater recovery process, resulting in reduced energy consumption and a corresponding reduction in greenhouse gas emissions.

Certain embodiments of the inventive whitewater recovery systems and methods described herein can be integrated with papermaking processes in any suitable fashion. That is to say, the whitewater that is fed to the whitewater recovery system can originate from any suitable location in the papermaking process, and the recovered whitewater can be re-introduced to the papermaking process at any suitable location. In certain embodiments, the whitewater that is to be recovered (e.g., within stream 105, 205, and/or 305) originates from a paper machine (e.g., the seal pit of a paper machine), a fiber recovery device (e.g., the clear leg of a fiber recovery device such as a disc filter), or a similar device or location within a papermaking process. In certain embodiments, the recovered whitewater (e.g., the whitewater within stream 115, 225, 340, 350, and/or 360) can be distributed to a single or multiple points within the papermaking process, including the paper machine, the paper machine support systems, and/or the pulp mill for reuse.

In general, it is not practical, nor is it necessary to process the full flow of the whitewater loops within a typical papermaking process. Rather, it is generally only necessary to process a sufficiently sized slip stream of the whitewater that includes a sufficient contaminant load for removal to bring the system into equilibrium. Generally, the contaminant removal rate of the overall whitewater recovery and purification process should be greater than the contaminant introduction rate within the papermaking process.

The following examples are intended to illustrate certain embodiments of the present invention, but do not exemplify the full scope of the invention.

Example 1

This example describes the use of an ion exchange resin to remove multivalent cations from whitewater samples. A detailed analysis of the mill whitewater sample used for the ion exchange testing described in this example is outlined in Table 1 below.

TABLE 1

Composition of Mill Whitewater Analyzed in Example 1.

| Species | Formula Wt. | Amount mg/L | Equiv. Wt. mg/L | Amount meq/L | Conv. Factor (x) | Amount mg/L as $CaCO_3$ |
|---|---|---|---|---|---|---|
| CATIONS | | | | | | |
| $Ca(+2)$ | 40.08 | 48 | 20.04 | 2.35 | 2.50 | 119.76 |
| $Mg(+2)$ | 24.31 | 4.6 | 12.16 | 0.38 | 4.11 | 18.92 |
| $Na(+)$ | 22.99 | 726 | 22.99 | | 2.17 | 1578.96 |
| $K(+)$ | 39.10 | 25.2 | 39.10 | | 1.28 | 32.22 |
| $Sr(+2)$ | 87.62 | 0.13 | 43.81 | 0.0030 | 1.14 | 0.15 |
| $Ba(+2)$ | 137.33 | 0.1 | 68.67 | 0.0010 | 0.73 | 0.07 |
| $Al(+3)$ | 26.98 | | 8.99 | | 5.56 | 0.00 |
| $NH_4(+)$ | 18.04 | | 18.04 | | 2.77 | 0.00 |
| $Cr(+3)$ | 52.00 | | 17.33 | | 2.88 | 0.00 |
| $Fe(+2)$ | 55.85 | | 27.93 | | 1.79 | 0.00 |
| $Fe(+3)$ | 55.85 | 1 | 18.62 | 0.0500 | 2.69 | 2.69 |
| $Mn(+2)$ | 54.94 | 0.23 | 27.47 | 0.0080 | 1.82 | 0.42 |
| $Ni(+2)$ | 58.71 | | 29.36 | | 1.70 | 0.00 |
| $Cu(+2)$ | 63.54 | | 31.77 | | 1.57 | 0.00 |
| $Ag(+)$ | 107.87 | | 107.87 | | 0.46 | 0.00 |
| $Zn(+2)$ | 65.37 | | 32.69 | | 1.53 | 0.00 |
| $Cd(+2)$ | 112.40 | | 56.20 | | 0.89 | 0.00 |
| $Sn(+2)$ | 118.69 | | 59.35 | | 0.84 | 0.00 |
| $Pb(+2)$ | 207.19 | | 103.60 | | 0.48 | 0.00 |
| TOTAL CATIONS: | | | | 2.79200 | — | 1753.19 |
| ANIONS | | | | | | |
| $HCO_3(-)$ | 61.02 | 876 | 61.02 | | 0.82 | 717.83 |
| $CO_3(-2)$ | 60.01 | | 30.00 | | 1.67 | 0.00 |
| $SO_4(-2)$ | 96.06 | 110 | 48.03 | | 1.04 | 114.51 |
| $Cl(-)$ | 35.45 | 130 | 35.45 | | 1.41 | 183.34 |
| $NO_3(-)$ | 62.01 | 2.1 | 62.01 | | 0.81 | 1.69 |
| $PO_4(-3)$ | 94.97 | 2.7 | 31.66 | | 1.58 | 4.26 |
| $CrO_4(-2)$ | 115.99 | | 58.00 | | 0.86 | 0.00 |
| $F(-)$ | 19.00 | | 19.00 | | 2.63 | 0.00 |
| $MoO_4(-2)$ | 159.94 | | 79.97 | | 0.63 | 0.00 |
| $WO_4(-2)$ | 247.84 | | 123.92 | | 0.40 | 0.00 |
| B | 10.81 | | 10.81 | | 4.63 | 0.00 |
| TOTAL ANIONS: | | | | | — | 1021.64 |
| $SiO_2$ | | 60.09 | 60.1 | | 0.83 | |
| TDS | ppm NaCl | ppm $CaCO_3$ | Conductivity | | umho/cm or uS/cm | |
| COD | | 4300 | | | | |
| OTHER | pH | 6.5 | Temperature | | | |
| | TOC | | Turbidity | | | |
| | TDS | | TSS | | | 590.00 |

The species targeted for removal via the ion exchange process were calcium ($Ca^{2+}$), magnesium ($Mg^{2+}$), strontium ($Sr^{2+}$), barium ($Br^{2+}$), Iron ($Fe^{2+}$), and manganese ($Mn^{2+}$). Aluminum ($Al^{3+}$) was also targeted for removal, but its concentration was not analyzed during this session of testing.

Lewatit® CNP80-WS from Lanxess (Leverkusen, Germany), which is a weak acid cation (WAC) resin, was used as the ion exchange resin. The operating capacity of the ion exchange resin was determined by considering the combined equivalent ionic load from the above-identified target species, along with the amount of whitewater processed during the testing. The volume of resin used in the testing was 260 milliliters. The total amount of whitewater that was processed was about 170 liters. The targeted combined ionic load from the target species removed by the ion exchange resin during testing was 481 MEQ/mL. Therefore, the target operating capacity was 1.85 EQ/L, or 40.4 kilograins/cubic foot of resin. During testing, the whitewater sample was held at 70° F. The capacity for the WAC resin increased with an increase in temperature. The actual field operating temperature for the whitewater at the mill from which the whitewater was sampled was 122° F. Therefore, it is expected that the actual capacity realized in the field would be even greater than that reported in this example.

Figure 5A:
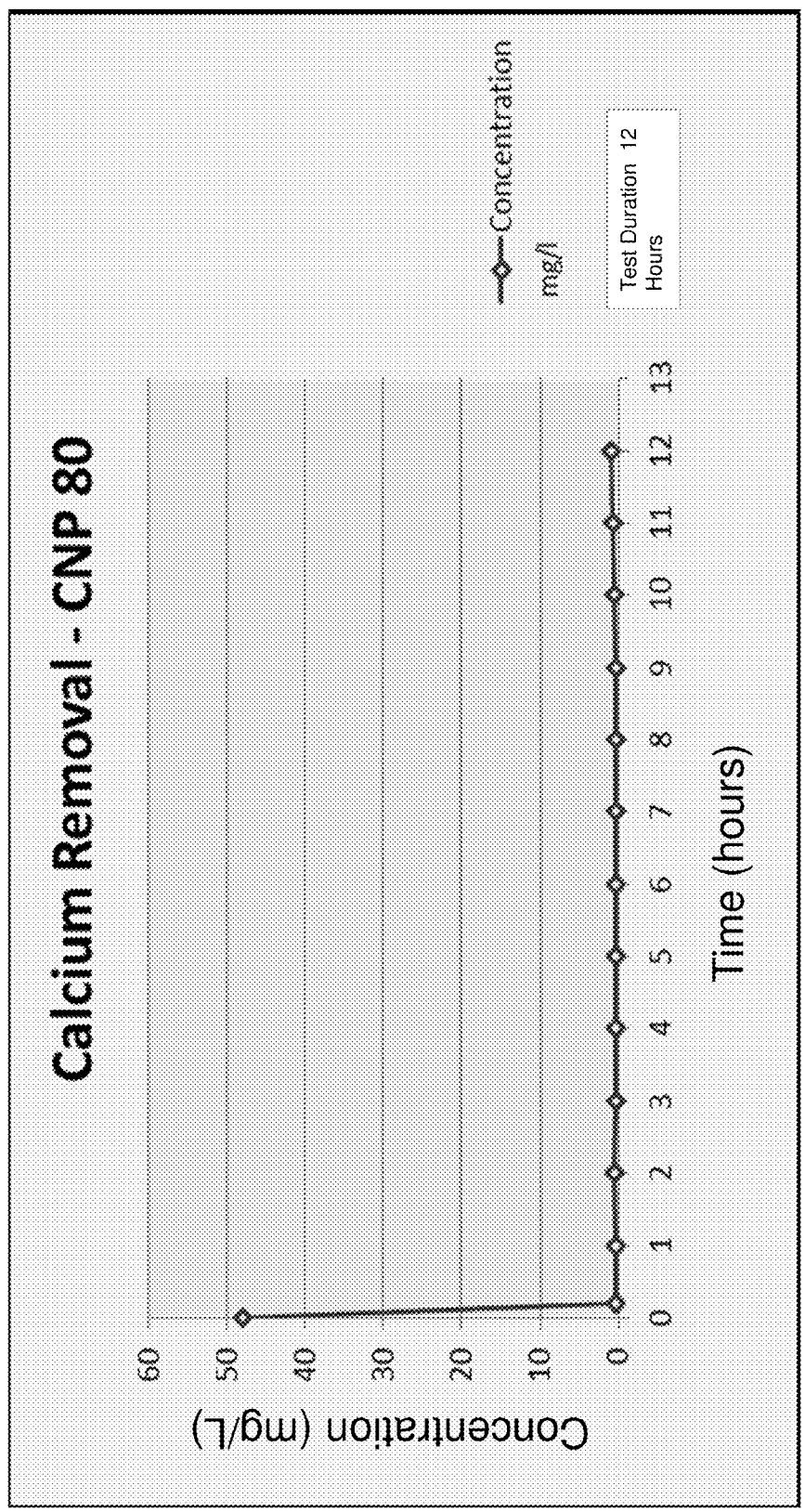
FIGS. 5A-5C are, according to one set of embodiments, plots of the concentration of calcium, magnesium, and manganese as a function of the duration of an ion exchange process step.
Figure 5B:
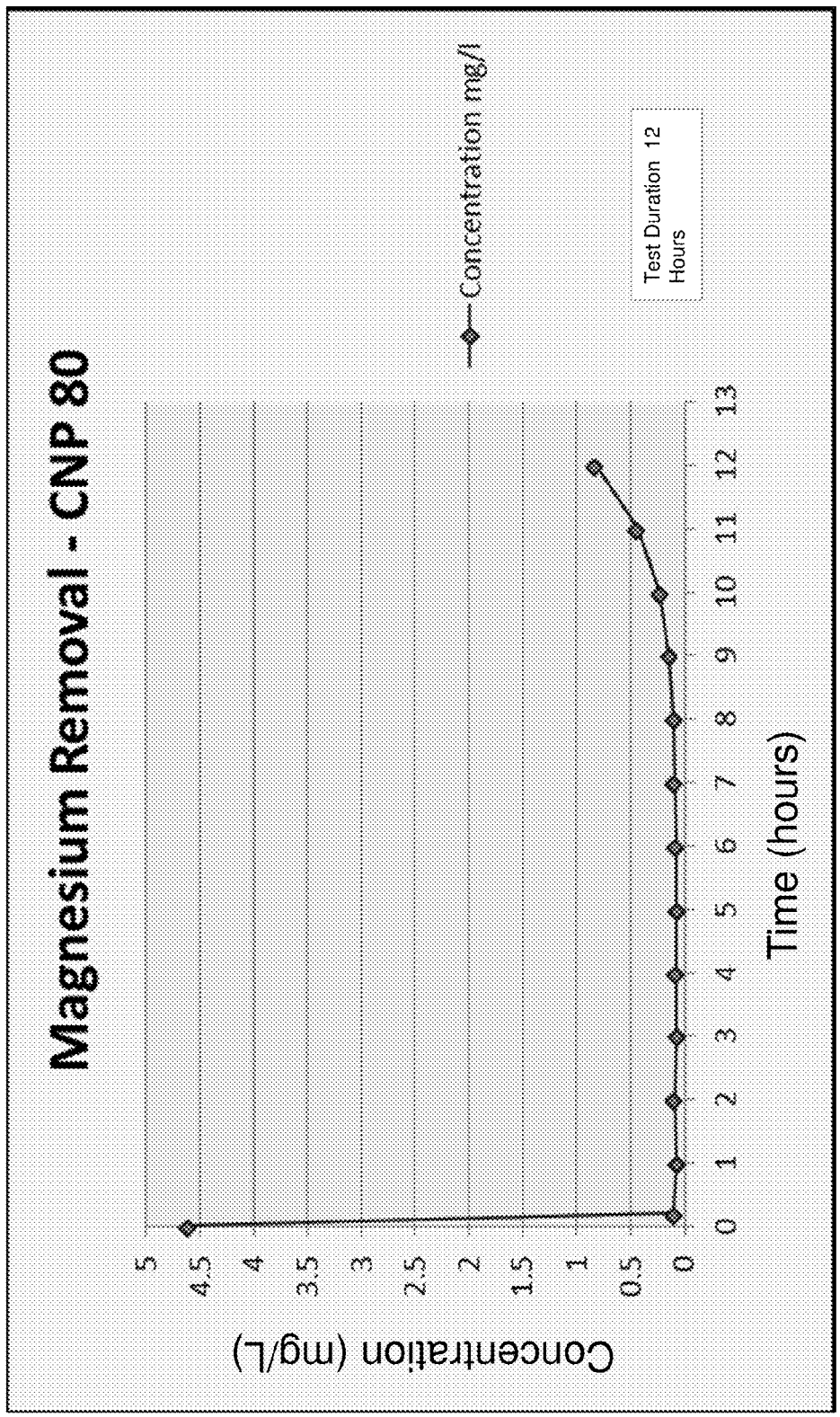
Figure 5C:
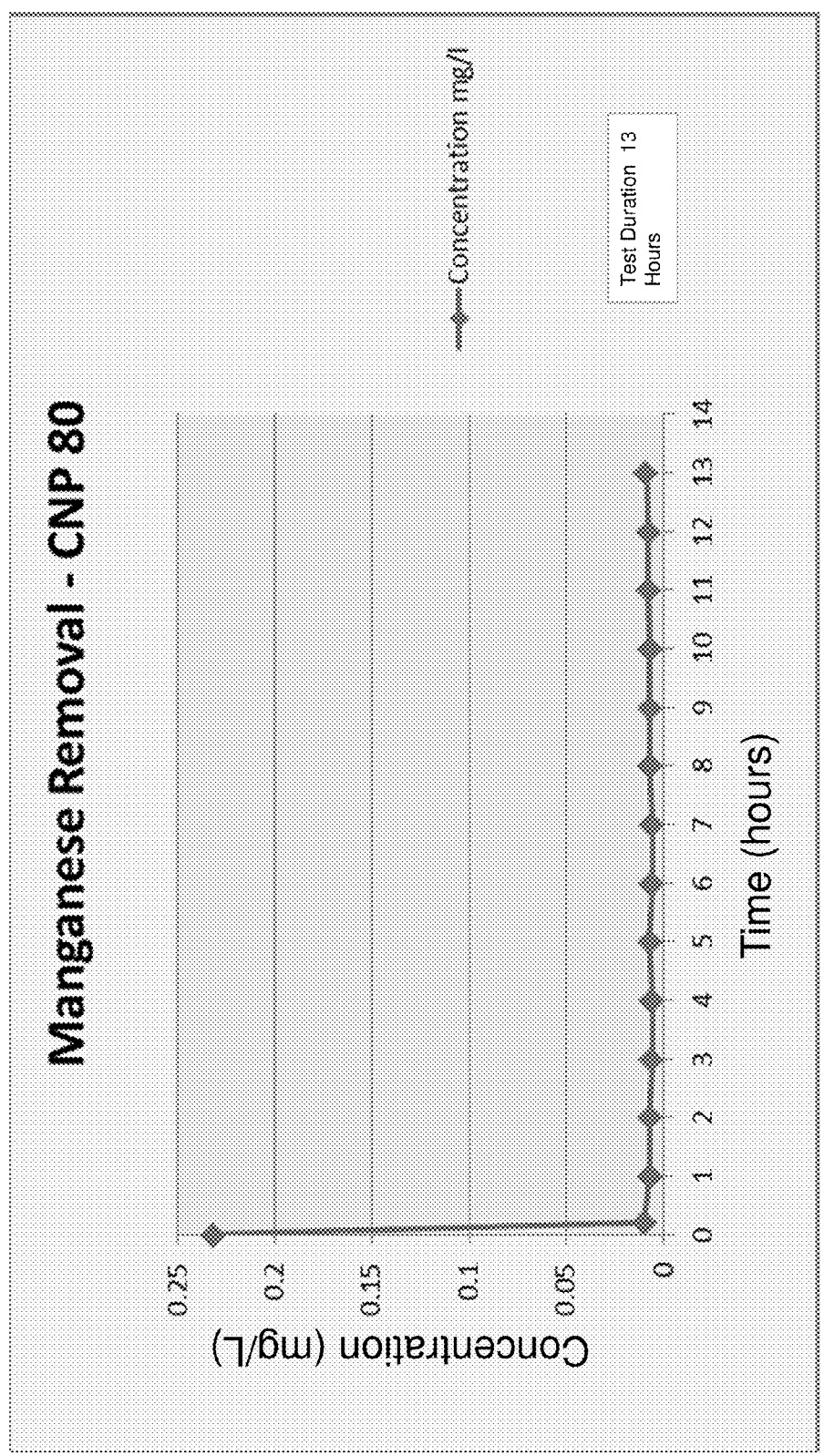

The whitewater sample was pre-filtered using a 15 micrometer cartridge filter. The whitewater was transported through the ion exchange resin at a rate of 13 liters/hour (about 50 bed volumes per hour). The test run was performed for 13 hours. FIGS. 5A, 5B, and 5C are plots of the concentrations of calcium, magnesium, and manganese, respectively, as a function of the testing time. The testing demonstrated an operating capacity of 1.85 EQ/L. As can be seen from FIGS. 5A-5C, the concentrations of each of calcium, magnesium, and manganese were greatly reduced within the first few minutes. In addition, the iron content of the whitewater was reduced from 1.04 mg/L to 0.4 mg/L (a 61% reduction); the strontium content was reduced from 0.13 mg/L to less than 0.01 mg/L (a 92% reduction); and the barium content was reduced from 0.099 mg/L to 0.007 mg/L (a 93% reduction).

Comparative Example 2

This example describes the use of chemical softening—a strategy commonly employed in prior systems—to control ion concentration within a whitewater stream.

Chemical softening is a well-established process used to remove multivalent cations from aqueous streams. In a typical chemical softening process, the pH of the recovered water is raised (e.g., to a pH of 10.5, 11, or higher) to decrease the solubility of sparingly soluble salts (e.g., multivalent cations such as $Ca^{2+}$, $Mg^{2+}$, and the like). Once the sparingly soluble salts reach their saturation point, they precipitate, and can be removed from the water as sludge in an external solids dewatering step.

A 20 gallon sample of whitewater was subjected to a chemical softening process. The chemical properties of the whitewater sample is outlined in Table 2 below.

TABLE 2

| Chemical properties of whitewater sample tested in Comparative Example 2 | |
| --- | --- |
| pH | 5.5 |
| TSS | 133 mg/l |
| TDS | 5880 mg/l |
| Calcium | 586 mg/l as $CaCO_3$ |
| Sodium | 1440 mg/l as $CaCO_3$ |
| Magnesium | 86 mg/l as $CaCO_3$ |
| Alkalinity | 417 mg/l |
| Sulfate | 300 mg/l |
| Temperature | 140° F. |

The goal of the chemical softening process was to reduce total suspended solids (TSS) to less than 30 mg/L, reduce the calcium ion concentration to less than 20 mg/L as $CaCO_3$, and to reduce the magnesium ion concentration to less than 20 mg/L as $CaCO_3$. To achieve these target removal end points, 900 mg/L of hydrated lime ($Ca(OH)_2$) and 1900 mg/L of soda ash ($Na_2CO_3$) were added to the water. The pH of the water was about 11 during the processing step.

After addition of the hydrated lime and soda ash, the total suspended solids (TSS) were increased to 400 mg/L, the amount of calcium ions in the water was reduced to 16 mg/L as $CaCO_3$, and the amount of magnesium ions in the water was reduced to 2.3 mg/L, both below their target levels. However, adding the hydrated lime and soda ash to the whitewater increased—rather than decreased—the amount of total suspended solids within the whitewater. Increasing levels of suspended solids in a whitewater stream would lead to machine fouling upon recycling the whitewater back to the papermaking process. In addition, the amount of total dissolved solids in the recovered stream increased to 4500 mg/L. Increasing TDS concentrations generally increases the solubility of many sparingly soluble salts, which can interfere with the performance of the chemical softener and necessitate a further increase in chemical addition. Also increases in TDS results in consumption of drainage aids. This causes a wetter sheet to enter the dryer section and increase steam energy demand to dry the wetter sheet.

The chemical softening process creates a number of additional undesirable effects (in addition to the issues associated with increasing the TDS and TSS levels) during cycles of recovery and concentration of contaminants in whitewater loops. For example, space requirements for chemical softening processes are significantly larger and more costly to implement, relative to the inventive systems described elsewhere herein. Chemical softening processes generally require a circular solids contact softening clarifier. Based on the testing, A 3000 gpm whitewater softening clarifier would require approximately 910 square feet of a clarifier reaction zone. In addition the chemical softeners require a number of large and costly support equipment, including a lime silo for slaked lime, soda ash storage and feed system, polymer storage and feed systems, and sludge handling systems.

Chemical softening process also generally produce large volumes of sludge with little or no recovery value and discharge significant amounts of salts into the environment.

In addition, large scale clarification systems are normally placed outside and are open to the atmosphere, which can create heat losses. The heat loss would diminish the potential for recovering and using warm (e.g., 100° F. to 140° F.) whitewater.

Finally, solids contact softening clarifiers are generally used in chemical softening processes. The solids contact softening clarifiers generally operate at atmospheric pressures, which results in line pressure loss when the whitewater enters the clarifier. A subsequent re-pressurization pump station is then needed to transport the supernatant water. The use of a re-pressurization pump station increases energy demands for the system and diminishes the potential return on investment of the whitewater recycling process.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of treating whitewater, comprising:
    exposing a liquid input stream comprising whitewater or derived from whitewater and containing cations and suspended solids to a flocculent such that agglomerations of flocculent and suspended solids are formed;
    removing at least a portion of the agglomerations from the liquid input stream to produce a supernatant stream containing a lower quantity of suspended solids than the liquid input stream;
    filtering the supernatant stream to produce a retentate stream and a filtrate stream containing a lower quantity of suspended solids than the retentate stream; and
    reducing an amount of total dissolved solids within the filtrate stream by performing reverse osmosis and/or nanofiltration on the filtrate stream.

2. The method of claim 1, wherein exposing the liquid input stream to the flocculent comprises transporting the liquid input stream to a flocculation vessel containing the flocculent.

3. The method of claim 2, comprising gravity settling at least a portion of the agglomerations of flocculent and suspended solids.

4. The method of claim 3, wherein the gravity settling occurs within a gravity settling clarifier.

5. The method of claim 1, comprising introducing gas into the liquid input stream.

6. The method of claim 5, wherein the gas is introduced into the liquid input within a dissolved gas flotation separation apparatus.

7. The method of claim 1, comprising filtering the supernatant stream using a disc filter, a pressurized screen filter, a strainer, and/or a depth filtration medium.

8. The method of claim 1, comprising exposing at least a portion of the retentate stream to the flocculent.

9. The method of claim 1, wherein reducing the amount of total dissolved solids within the filtrate stream comprises performing reverse osmosis on the filtrate stream.

10. The method of claim 1, wherein reducing the amount of total dissolved solids within the filtrate stream comprises performing nanofiltration on the filtrate stream.

11. The method of claim 1, comprising exposing the filtrate stream to ultraviolet electromagnetic radiation.

12. The method of claim 1, wherein the suspended solids comprise colloidal solids and/or organic solids.

13. The method of claim 12, wherein the suspended solids comprise colloidal solids.

14. The method of claim 12, wherein the suspended solids comprise anionic trash, and exposing the liquid input stream to the flocculent forms agglomerations of the flocculent and the anionic trash.

15. The method of claim 1, wherein the liquid input stream comprises calcium carbonate.

16. The method of claim 15, wherein the calcium carbonate comprises precipitated calcium carbonate.

17. The method of claim 1, wherein the step of exposing the liquid input stream to the flocculent comprises exposing the liquid input stream to a non-magnetic flocculent.

18. The method of claim 1, wherein exposing the liquid input stream to the flocculent occurs within a sedimentation apparatus.

19. The method of claim 1, wherein exposing the liquid input stream to the flocculent occurs within a floatation clarifier.

20. The method of claim 1, wherein the flocculent comprises a magnetically-responsive material.

* * * * *